US012750601B2

(12) United States Patent
Sekine

(10) Patent No.: US 12,750,601 B2
(45) Date of Patent: Sep. 29, 2026

(54) PHOTOELECTRIC CONVERSION APPARATUS, PHOTOELECTRIC CONVERSION SYSTEM, AND MOVING OBJECT

(71) Applicant: CANON KABUSHIKI KAISHA, Tokyo (JP)

(72) Inventor: Hiroshi Sekine, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 55 days.

(21) Appl. No.: 18/907,031

(22) Filed: Oct. 4, 2024

(65) Prior Publication Data

US 2025/0119663 A1 Apr. 10, 2025

(30) Foreign Application Priority Data

Oct. 5, 2023 (JP) ................................ 2023-173736

(51) Int. Cl.

| | |
|---|---|
| ***H04N 25/707*** | (2023.01) |
| ***H04N 23/667*** | (2023.01) |
| ***H04N 25/709*** | (2023.01) |
| ***H04N 25/773*** | (2023.01) |
| ***H04N 25/79*** | (2023.01) |

(52) U.S. Cl.

CPC ......... *H04N 25/707* (2023.01); *H04N 23/667* (2023.01); *H04N 25/709* (2023.01); *H04N 25/773* (2023.01); *H04N 25/79* (2023.01)

(58) Field of Classification Search

CPC .. H04N 23/667; H04N 25/707; H04N 25/709; H04N 25/773; H04N 25/79

See application file for complete search history.

(56) References Cited

U.S. PATENT DOCUMENTS

| | | | | |
|---|---|---|---|---|
| 2018/0278877 | A1* | 9/2018 | Yamahira | H04N 25/57 |
| 2021/0151481 | A1* | 5/2021 | Maehashi | H04N 25/443 |
| 2022/0006965 | A1 | 1/2022 | Zhu | |
| 2022/0264047 | A1* | 8/2022 | Antolovic | H04N 25/571 |
| 2023/0336884 | A1* | 10/2023 | Hanzawa | H04N 25/707 |
| 2023/0396893 | A1* | 12/2023 | Hwang | G01S 7/4816 |

FOREIGN PATENT DOCUMENTS

| | | |
|---|---|---|
| JP | 2020096347 A | 6/2020 |

* cited by examiner

*Primary Examiner* — Amy R Hsu

(74) *Attorney, Agent, or Firm* — Canon U.S.A., Inc. IP Division

(57) ABSTRACT

A detection circuit configured to detect whether an event has occurred based on whether an amount of change in an amount of incident light exceeds a predetermined threshold and a counting circuit configured to count the number of incident photons within a predetermined exposure period are included. A mode control circuit controls a first switch configured to switch between a first mode in which a photodiode and the detection circuit are connected to each other and a second mode in which the photodiode and the counting circuit are connected to each other.

17 Claims, 19 Drawing Sheets

PHOTOELECTRIC CONVERSION APPARATUS, PHOTOELECTRIC CONVERSION SYSTEM, AND MOVING OBJECT

BACKGROUND

Technical Field

The aspect of the embodiments relates to a photoelectric conversion apparatus, a photoelectric conversion system including the same, and a moving object.

Description of the Related Art

A photoelectric conversion apparatus in which pixels including a plurality of avalanche photodiodes (hereinafter, "APDs") are arranged is known. Each pixel is capable of detecting light at a single-photon level using avalanche multiplication caused by photoelectric charges generated by photons incident on the APDs.

Japanese Patent Application Laid-Open No. 2020-96347 discusses a light detection device including detection pixels configured to detect the presence or absence of an event and pixels including APDs configured to count the number of incident photons during an exposure period in a case where the event has occurred, and a control method thereof.

According to Japanese Patent Application Laid-Open No. 2020-96347, circuits configured to detect the presence or absence of the event and photon counting circuits are arranged at separate locations. Thus, in a case where a large number of circuits configured to detect the presence or absence of the event are arranged, the photon counting circuits become insufficient, and a decrease in resolution occurs. On the other hand, in a case where a large number of photon counting circuits are arranged, the circuits configured to detect the presence or absence of the event become insufficient, and an event detection omission may occur.

SUMMARY

According to an aspect of the embodiments, an apparatus includes a photodiode including a first terminal and a second terminal, a detection circuit configured to detect whether an event has occurred based on whether an amount of change in an amount of incident light exceeds a predetermined threshold, a counting circuit configured to count the number of incident photons within a predetermined exposure period, a first switch configured to switch between a first mode in which the photodiode and the detection circuit are connected to each other and a second mode in which the photodiode and the counting circuit are connected to each other, and a control circuit configured to control the first switch.

Further features of the disclosure will become apparent from the following description of exemplary embodiments with reference to the attached drawings.

DESCRIPTION OF THE EMBODIMENTS

Figure 1:
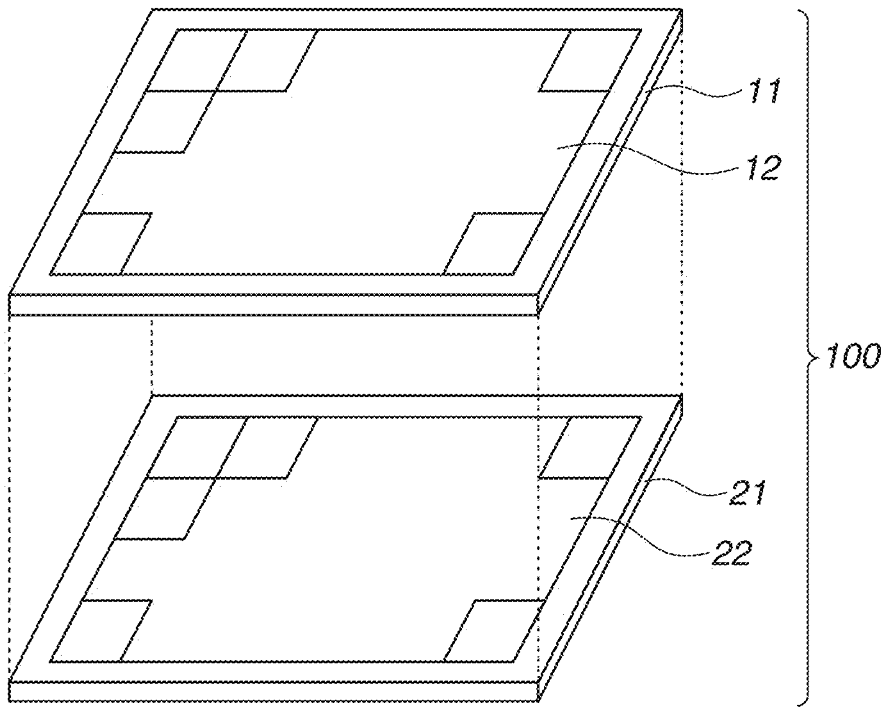
FIG. 1 is a diagram illustrating a structure of a photoelectric conversion apparatus according to an exemplary embodiment.

The following exemplary embodiments are mere concretizations of the technical concept of the disclosure and are not intended to limit the disclosure. Sizes and positional relationships of components illustrated in the drawings are sometimes exaggerated to clarify the description. In the following description, corresponding components are assigned the same reference number, and redundant descriptions thereof are sometimes omitted.

Various exemplary embodiments of the disclosure will be described in detail below with reference to the drawings. In the following description, terms that indicate specific directions or positions (e.g., "up", "down", "right", "left", and other terms including the foregoing terms) will be used as needed. The terms are used to facilitate understanding of the exemplary embodiments with reference to the drawings, and the technical scope of the disclosure should not be limited by the meanings of the terms.

In the present specification, the term “plan view” refers to a view from a direction perpendicular to a light incident surface of a semiconductor layer. Further, the term “section view” refers to a surface in the direction perpendicular to the light incident surface of the semiconductor layer. In a case where the light incident surface of the semiconductor layer that is viewed microscopically is a rough surface, the plan view is defined using the light incident surface of the semiconductor layer that is viewed macroscopically as a reference.

In the following description, an anode of an avalanche photodiode (APD) is set to a fixed potential, and signals are extracted from the cathode side. Thus, a first conductivity type semiconductor region in which charges with the same polarity as signal charges are majority carriers is an N-type semiconductor region, whereas a second conductivity type semiconductor region in which charges with a different polarity from signal charges are majority carriers is a P-type semiconductor region.

The aspect of the embodiments is valid even in a case where the cathode of the APD is set to a fixed potential and signals are extracted from the anode side. In this case, the first conductivity type semiconductor region in which charges with the same polarity as signal charges are majority carriers is a P-type semiconductor region, whereas the second conductivity type semiconductor region in which charges with a different polarity from signal charges are majority carriers is an N-type semiconductor region. While a case where one of the nodes of the APD is set to a fixed potential will be described below, the potentials of both nodes may be variable.

In the present specification, the term “impurity concentration” used alone refers to a net impurity concentration after subtracting the portion compensated by opposite conductivity type impurities. Specifically, the term “impurity concentration” refers to a net doping concentration. A region with a higher P-type dopant concentration than an N-type dopant concentration is a P-type semiconductor region. On the other hand, a region with a higher N-type dopant concentration than a P-type dopant concentration is an N-type semiconductor region.

Further, in the following exemplary embodiments, connections between circuit elements are sometimes described. In this case, unless otherwise specified, elements of interest are treated as being connected to each other even if another element is between the elements of interest. For example, there may be a case where an element A is connected to a node of a capacitor element C including a plurality of nodes and an element B is connected to another node of the capacitor element C. Even in this case, unless otherwise specified, the elements A and B are treated as being connected to each other.

Common structures and configurations of photoelectric conversion apparatuses and methods for driving the same according to the exemplary embodiments of the disclosure will be described below with reference to FIGS. 1 to 5A and 5B.

FIG. 1 is a diagram illustrating a structure of a stacked photoelectric conversion apparatus 100. The photoelectric conversion apparatus 100 includes a sensor substrate 11 and a circuit substrate 21, and the two substrates 11 and 12 are stacked and electrically connected to each other. The sensor substrate 11 includes a first semiconductor layer and a first wiring structure. The first semiconductor layer includes photoelectric conversion portions 102 described below. The circuit substrate 21 includes a second semiconductor layer and a second wiring structure. The second semiconductor layer includes signal processing circuits such as signal processing portions 103 described below. The photoelectric conversion apparatus 100 includes the second semiconductor layer, the second wiring structure, the first wiring structure, and the first semiconductor layer stacked in this order. The photoelectric conversion apparatuses according to the exemplary embodiments are back-illuminated photoelectric conversion apparatuses with a second surface from which light enters and a first surface on which a circuit substrate is provided.

While the sensor substrate 11 and the circuit substrate 21 that are diced chips will be described above, the sensor substrate 11 and the circuit substrate 21 are not limited to chips. For example, the sensor substrate 11 and the circuit substrate 21 may be wafers. Further, the sensor substrate 11 and the circuit substrate 21 in wafer form may be stacked together and then diced, or the sensor substrate 11 and the circuit substrate 21 in wafer form may be diced into chips and then the chips may be stacked and bonded together.

The sensor substrate 11 is provided with a pixel region 12, and the circuit substrate 21 is provided with a circuit region 22 for processing signals detected by the pixel region 12.

Figure 2:
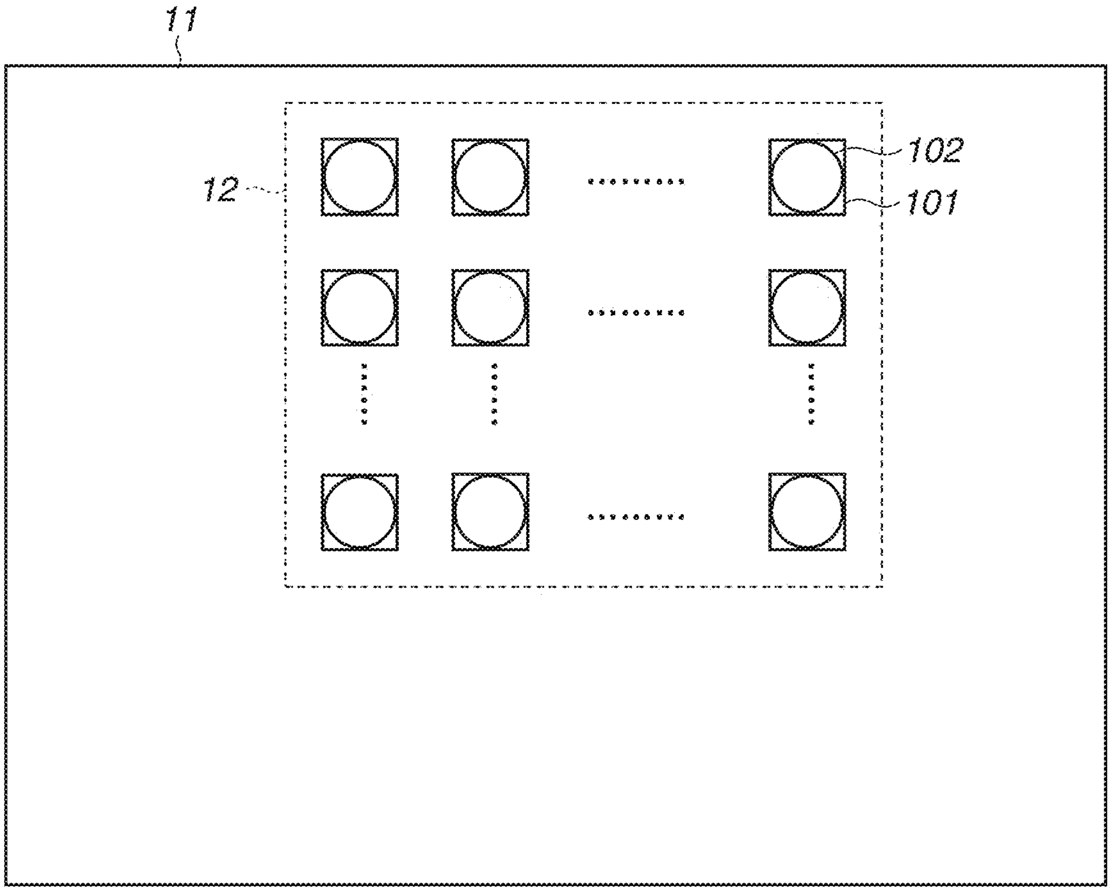
FIG. 2 is a diagram illustrating a layout on a sensor substrate of a photoelectric conversion apparatus according to an exemplary embodiment.

FIG. 2 is a diagram illustrating an example of a layout on the sensor substrate 11. Each pixel 101 including the photoelectric conversion portion 102 containing an avalanche photodiode (APD) is arranged in a two-dimensional array in a planar view and forms the pixel region 12.

While the pixels 101 are typically pixels for forming images, in a case where the pixels 101 are used in time-of-flight (ToF) technology, the pixels 101 do not necessarily have to form images. Specifically, the pixels 101 may be used to measure the time of arrival of light and the amount of light.

Figure 3:
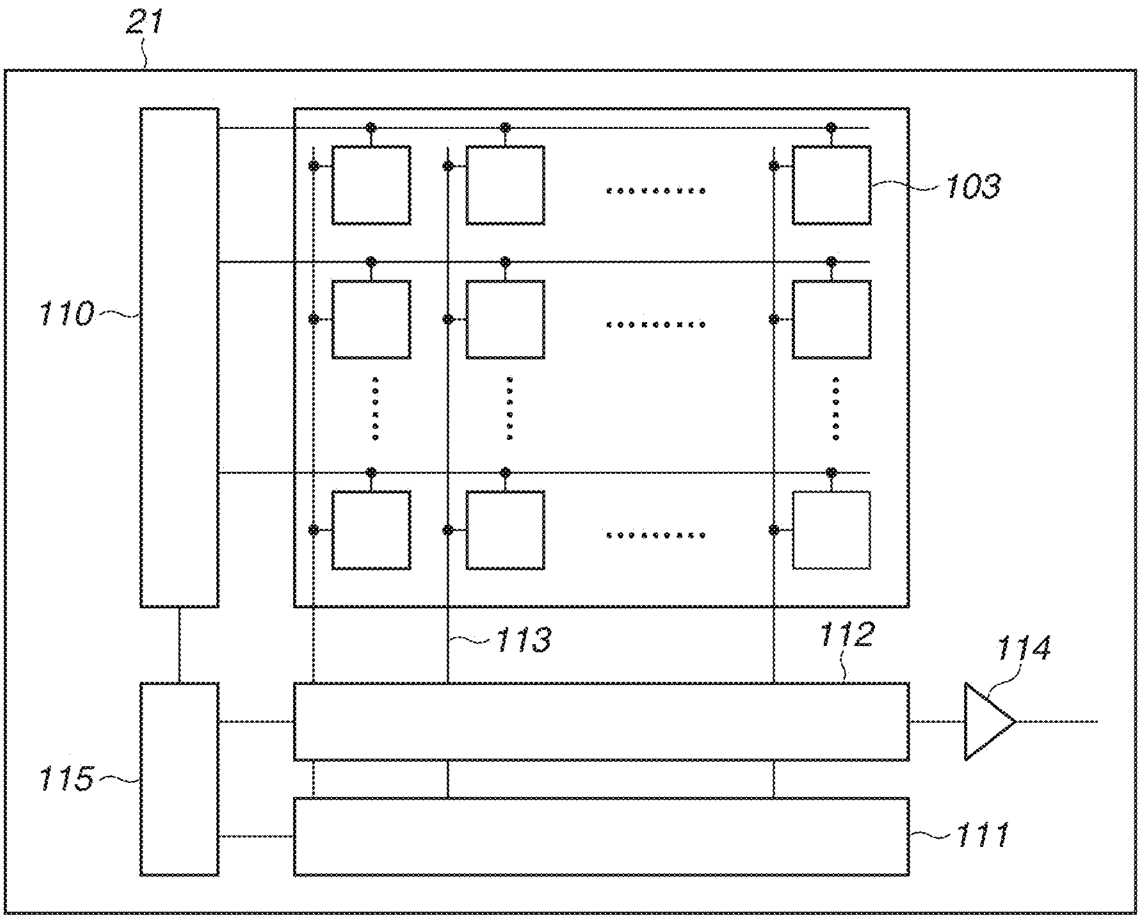
FIG. 3 is a diagram illustrating a configuration of a circuit substrate of a photoelectric conversion apparatus according to an exemplary embodiment.

FIG. 3 is a diagram illustrating a configuration of the circuit substrate 21. The circuit substrate 21 includes the signal processing portions 103, a reading circuit 112, a control pulse generation portion 115, a horizontal scanning circuit portion 111, signal lines 113, and a vertical scanning circuit portion 110. The signal processing portions 103 process charges generated by the photoelectric conversion portions 102 illustrated in FIG. 2 through photoelectric conversion.

The photoelectric conversion portions 102 in FIG. 2 and the signal processing portions 103 in FIG. 3 are electrically connected to each other via connecting wires provided for each pixel 101.

The vertical scanning circuit portion 110 receives control pulses supplied from the control pulse generation portion 115 and supplies control pulses to the pixels 101. Logic circuits such as shift registers and address decoders are used in the vertical scanning circuit portion 110.

Signals output from the photoelectric conversion portions 102 of the pixels 101 are processed by the signal processing portions 103. The signal processing portions 103 are provided with counters and memories, and the memories store digital values.

The horizontal scanning circuit portion 111 inputs control pulses for sequentially selecting each column to the signal processing portions 103 to read signals from the memories of the pixels 101 in which digital signals are stored.

Signals from the signal processing portions 103 of the pixels 101 selected by the vertical scanning circuit portion 110 from the selected column are output to the signal line 113.

The signals output to the signal line 113 are output to an external recording unit or a signal processing unit outside of the photoelectric conversion apparatus 100 via an output circuit 114.

In FIG. 2, the photoelectric conversion portions 102 in the pixel region 12 may be arranged in a one-dimensional array.

The function of the signal processing portion 103 does not necessarily have to be provided individually for every photoelectric conversion portion 102 and, for example, one signal processing portion 103 may be shared by a plurality of photoelectric conversion portions 102 and sequentially perform signal processing.

As illustrated in FIGS. 2 and 3, the plurality of signal processing portions 103 is arranged in a region overlapping the pixel region 12 in a planar view. Then, the vertical scanning circuit portion 110, the horizontal scanning circuit portion 111, the reading circuit 112, the output circuit 114, and the control pulse generation portion 115 are arranged to overlap a region between the edges of the sensor substrate 11 and the pixel region 12 in a planar view. In other words, the sensor substrate 11 includes the pixel region 12 and a non-pixel region around the pixel region 12. Then, the vertical scanning circuit portion 110, the horizontal scanning circuit portion 111, the reading circuit 112, the output circuit 114, and the control pulse generation portion 115 are arranged in a region overlapping the non-pixel region in a planar view.

Figure 4:
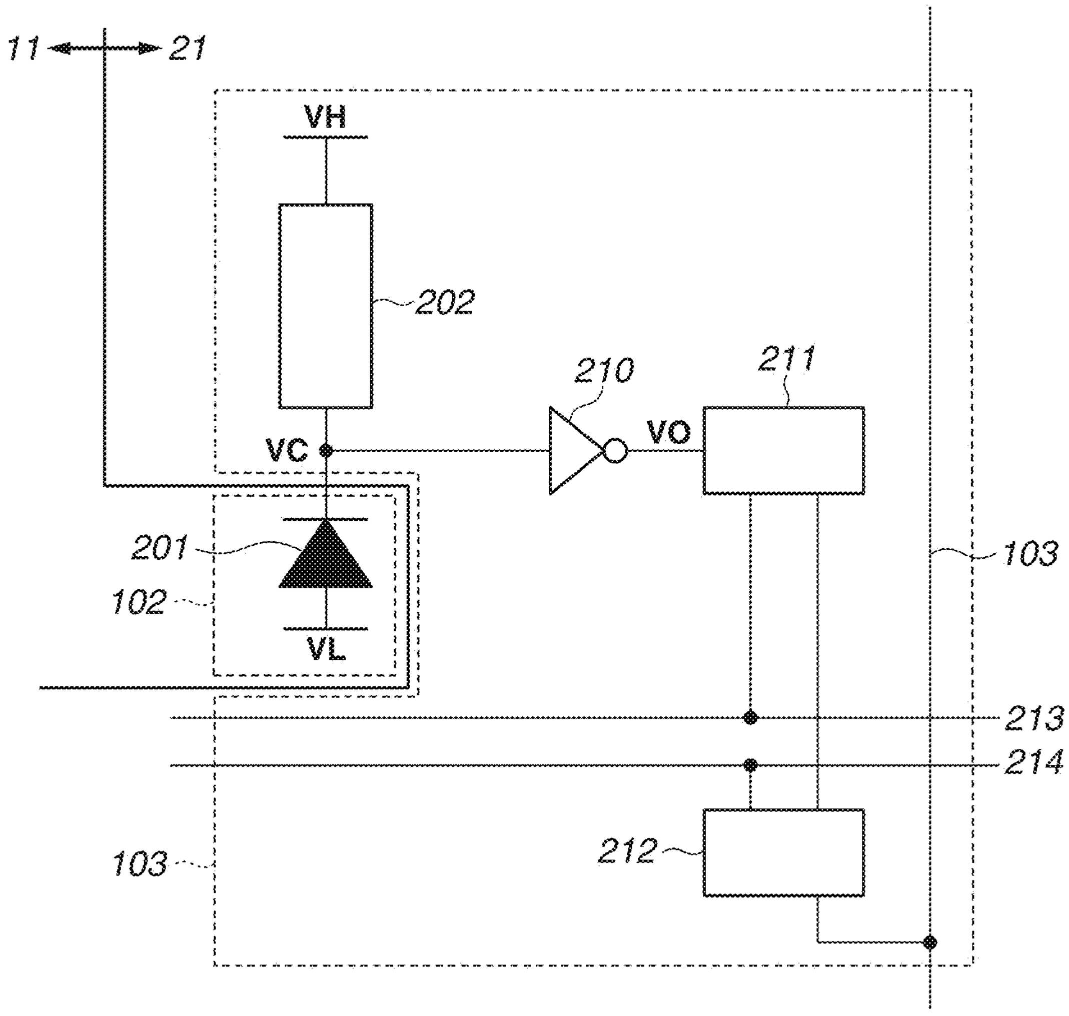
FIG. 4 is a block diagram illustrating one pixel of a sensor substrate and a circuit substrate according to an exemplary embodiment.

FIG. 4 illustrates an example of a block diagram including equivalent circuits of FIGS. 2 and 3. FIG. 4 illustrates a block diagram illustrating a photoelectric conversion apparatus including a general APD.

In FIG. 4, the photoelectric conversion portion 102 including an APD 201 is provided to the sensor substrate 11, and other members are provided to the circuit substrate 21.

The APD 201 generates charge pairs corresponding to incident light through photoelectric conversion. A voltage VL (first voltage) is supplied to an anode of the APD 201. Further, a voltage VH (second voltage) higher than the voltage VL supplied to the anode is supplied to a cathode of the APD 201. A reverse bias voltage that causes the APD 201 to perform an avalanche multiplication operation is supplied to the anode and the cathode. By supplying such a voltage, the charges generated by the incident light cause avalanche multiplication, resulting in an avalanche current.

In a case where the reverse bias voltage is supplied, operation is performed at a potential difference between the anode and the cathode that is above a breakdown voltage in a Geiger mode, whereas operation is performed at a potential difference between the anode and the cathode that is close to or equal to or less than the breakdown voltage in a linear mode.

An APD that operates in the Geiger mode will be referred to as a single photon avalanche diode (SPAD). For example, the voltage VL (first voltage) is −30 V, and the voltage VH (second voltage) is 1 V. The APD 201 may operate in the linear mode or in the Geiger mode.

A quenching element 202 is connected to the APD 201 and a power supply that supplies the voltage VH. The quenching element 202 functions as a load circuit (quenching circuit) during signal multiplication by avalanche multiplication and has the function (quenching operation) to reduce the voltage supplied to the APD 201 to stop avalanche multiplication. Further, the quenching element 202 has the function (recharging operation) to restore the voltage supplied to the APD 201 to the voltage VH by passing a current corresponding to the voltage drop caused by the quenching operation.

The signal processing portion 103 includes a waveform shaping portion 210, a counter 211, and a selection circuit 212.

In the present specification, the signal processing portion 103 is to include any of the waveform shaping portion 210, the counter 211, and the selection circuit 212.

The waveform shaping portion 210 shapes a change in potential of the cathode of the APD 201 that is obtained in a case where a photon is detected, and outputs a pulse signal. For example, an inverter circuit is used as the waveform shaping portion 210. While FIG. 4 illustrates an example in which one inverter is used as the waveform shaping portion 210, a circuit with a plurality of inverters connected in series may be used, or other circuits that have a waveform shaping effect may be used.

The counter 211 counts the number (number of times) of pulse signals output from the waveform shaping portion 210 and stores the count value. Further, the signal stored in the counter 211 is reset in a case where a control pulse pRES is supplied via a drive line 213.

A control pulse pSEL is supplied to the selection circuit 212 from the vertical scanning circuit portion 110 in FIG. 3 via a drive line 214 (not illustrated in FIG. 3) in FIG. 4 to switch the electrical connection between the counter 211 and the signal lines 113 on and off. The selection circuit 212 includes, for example, a buffer circuit for outputting signals.

A switch such as a transistor may be provided between the quenching element 202 and the APD 201 or between the photoelectric conversion portions 102 and the signal processing portions 103 to switch the electrical connection. Similarly, the supply of the voltage VH or VL to the photoelectric conversion portions 102 may be switched electrically using a switch such as a transistor.

Figure 5A:
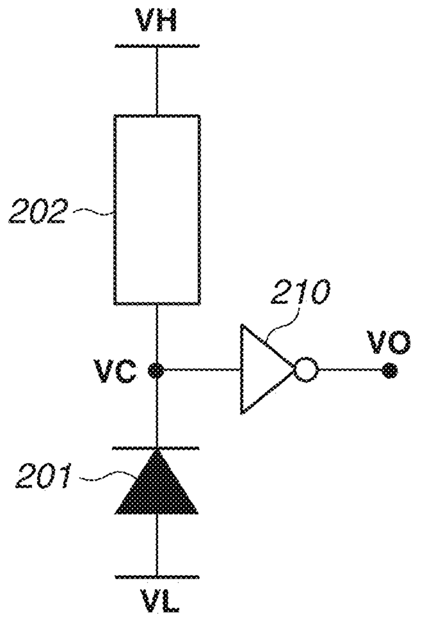
FIGS. 5A to 5C are schematic diagrams illustrating the driving of a pixel circuit of a photoelectric conversion apparatus according to an exemplary embodiment.
Figure 5B:
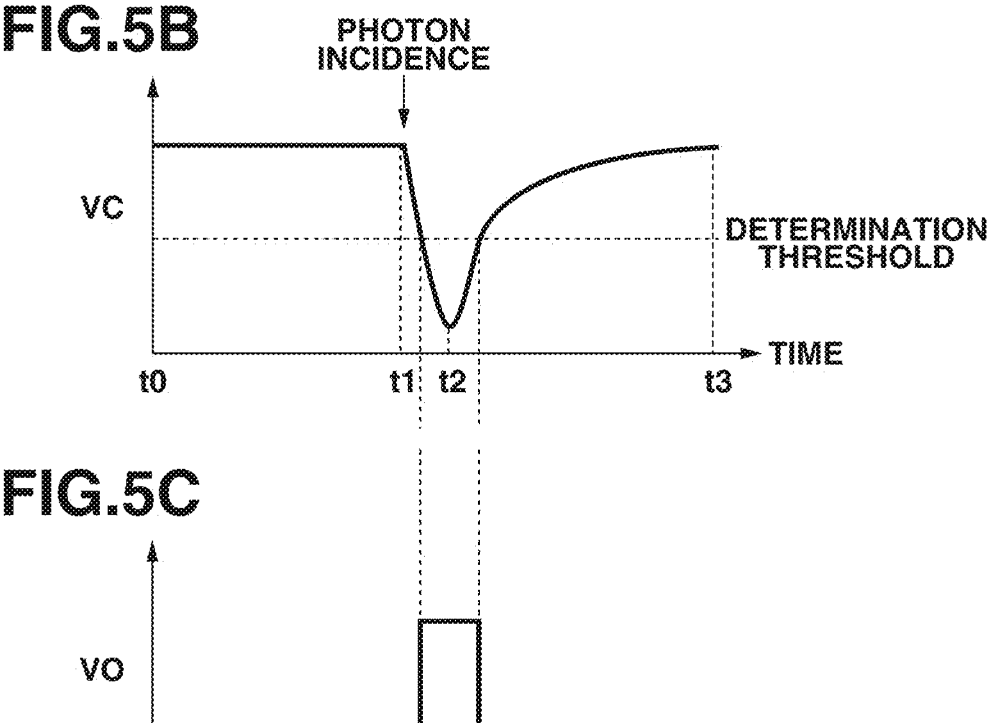
Figure 5C:
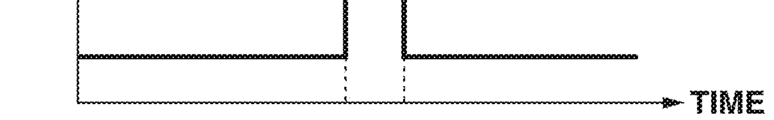

FIGS. 5A to 5C are diagrams schematically illustrating the relationship between the APD operation and the output signal.

FIG. 5A is an excerpted diagram illustrating the APD 201, the quenching element 202, and the waveform shaping portion 210 in FIG. 4. The input side and output side of the waveform shaping portion 210 are respectively denoted as VC and VO. FIG. 5B illustrates a change in waveform at VC in FIG. 5A, and FIG. 5C illustrates a change in waveform at VO in FIG. 5A.

From time t0 to time t1, a potential difference VH−VL is applied to the APD 201 in FIG. 5A. At time t1, a photon is incident on the APD 201, causing avalanche multiplication to occur in the APD 201, an avalanche multiplication current to flow in the quenching element 202, and the VC voltage to drop. In a case where the amount of voltage drop further increases and the potential difference applied to the APD 201 decreases, the avalanche multiplication in the APD 201 stops at time t2, and the VC voltage level no longer drops beyond a predetermined value. Thereafter, from time t2 to time t3, a current that compensates for the voltage drop flows from the voltage VL to VC, and at time t3, VC stabilizes at an original potential level. At this time, the output waveform portion that exceeds a threshold at VC undergoes waveform shaping by the waveform shaping portion 210, and the resulting signal is output from VO.

The arrangement of the signal lines 113, the reading circuit 112, and the output circuit 114 is not limited to the arrangement illustrated in FIG. 3. For example, the signal lines 113 may be arranged to extend in the row direction, and the reading circuit 112 may be arranged at the end of the extending signal lines 113.

A photoelectric conversion apparatus according to a first exemplary embodiment will be described below with reference to FIGS. 6 to 10.

Figure 6:
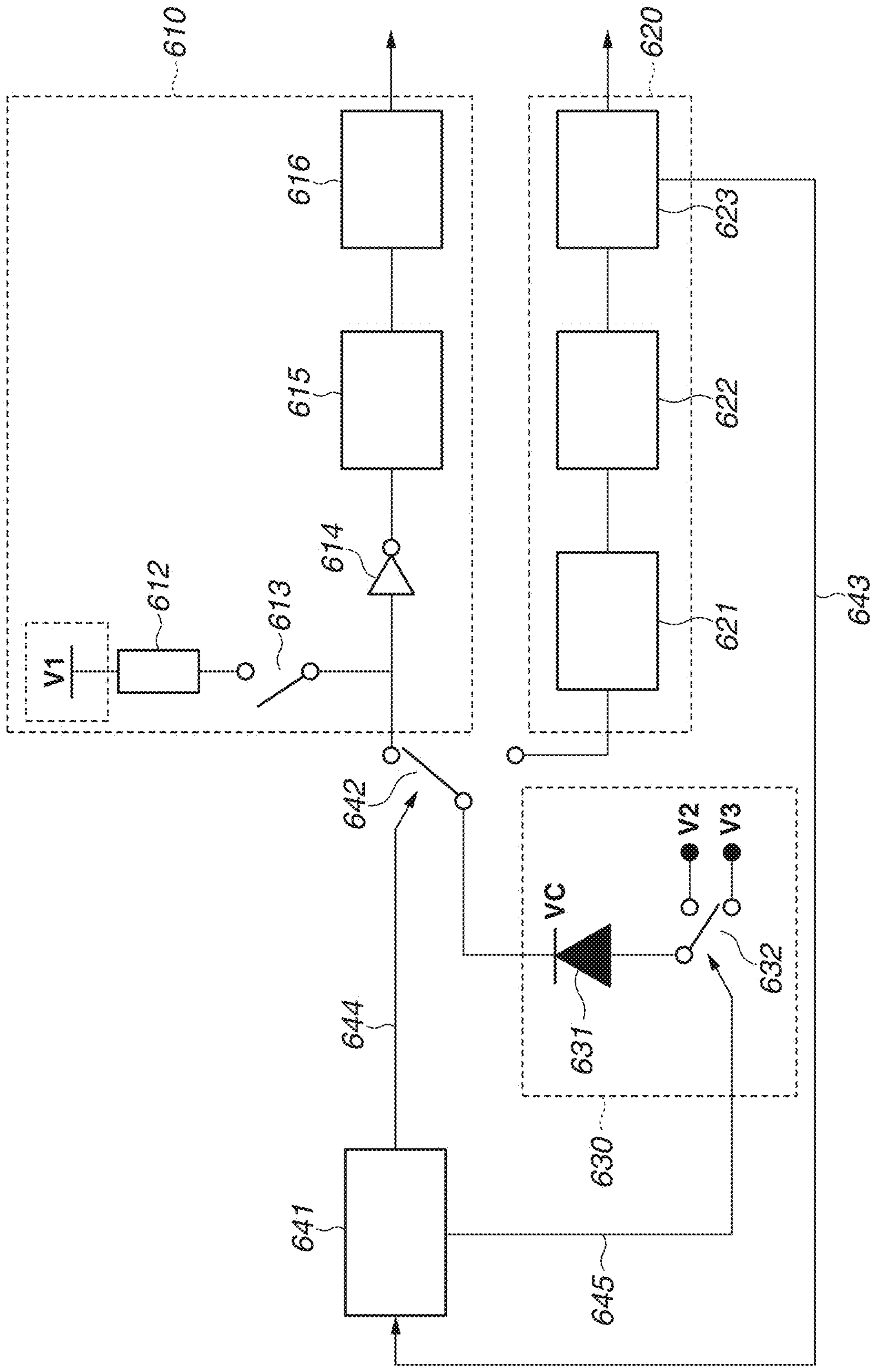
FIG. 6 illustrates an example of a configuration of a pixel circuit of a photoelectric conversion apparatus according to a first exemplary embodiment.

In FIG. 6, a photon counting circuit 610, an event detection circuit 620, a mode control circuit 641, and a photoelectric conversion portion 630 are illustrated. The photon counting circuit 610 includes a quenching element 612, a third switch 613, a waveform shaping portion 614, a counter circuit 615, and a memory 616. The memory 616 does not have to be included in the photon counting circuit 610.

The event detection circuit 620 includes a current-to-voltage (IV) converter 621, a voltage comparator 622, and a processing circuit 623. In a case where a predetermined condition is satisfied, the processing circuit 623 outputs a signal, and the output signal is input to the mode control circuit 641 via a control line 643.

The photoelectric conversion portion 630 includes a photodiode (PD) 631 and a second switch 632. The PD 631 includes an anode (first terminal) and a cathode (second terminal), and the second switch 632 switches the potential of the anode of the PD 631. The cathode of the PD 631 is connected in parallel to the photon counting circuit 610 and the event detection circuit 620 via a first switch 642. The first switch 642 switches between a first mode and a second mode. In the first mode, the PD 631 and the event detection circuit 620 are connected to each other, whereas in the second mode, the PD 631 and the photon counting circuit 610 are connected to each other.

The mode control circuit 641 controls the first switch 642 via a control line 644 based on the signal input from the processing circuit 623. Further, the mode control circuit 641 controls the second switch 632 via a control line 645.

Next, an operation according to the present exemplary embodiment will be described below with reference to FIGS. 6 to 9. The operation according to the present exemplary embodiment is executed based on steps S900 to S960 illustrated in FIG. 9.

In step S900, the operation is started, and in step S910, an event detection operation is executed. In this step, the first switch 642 is connected to the event detection circuit 620 (first mode), and the anode of the PD 631 is connected to a potential of V3 (e.g., 0 V).

Specifically, the anode of the PD 631 is connected to a ground potential. In a case where a photon is incident on the PD 631 in the above-described state, a photocurrent $I_{photo}$ generated by the incident light flows through the IV converter 621.

Figure 7:
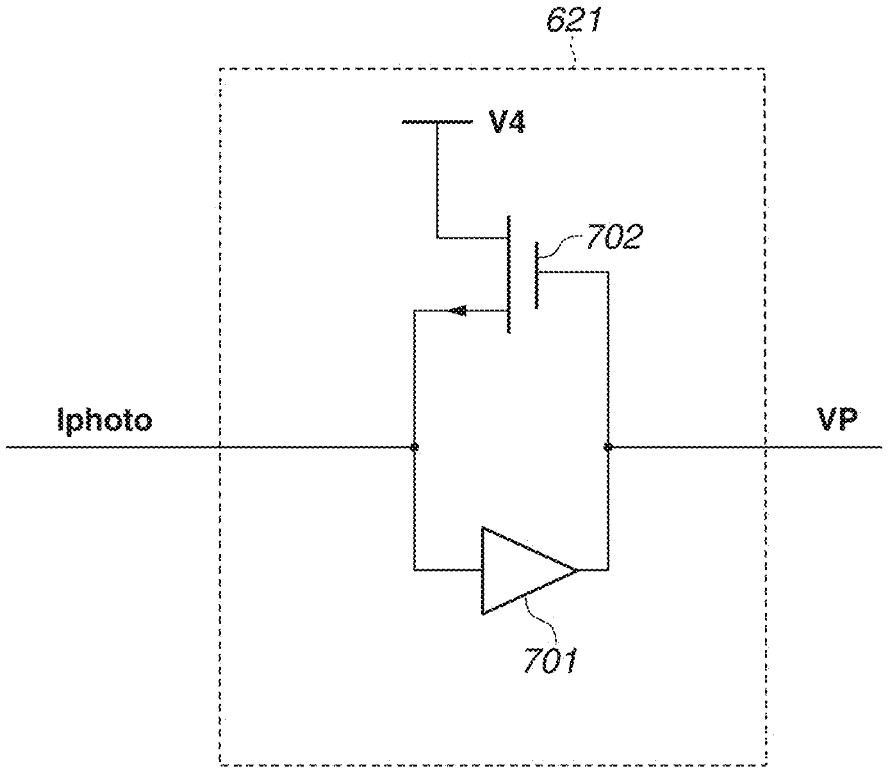
FIG. 7 is a diagram illustrating an example of a configuration of an event detection circuit according to the first exemplary embodiment.

The IV converter 621 converts the photocurrent $I_{photo}$ into a pixel voltage VP. The IV converter 621 is composed of, for example, an amplifier 701 and an N-type transistor 702 as illustrated in FIG. 7. A source of the N-type transistor 702 is connected to the cathode of the PD 631, and a drain of the N-type transistor 702 is connected to a power supply voltage V4 (e.g., 1 V). An input portion of the amplifier 701 is connected to the cathode of the PD 631. The source voltage of the N-type transistor 702 is fixed at a constant voltage by a transistor that is part of the amplifier 701. As the photocurrent $I_{photo}$ is generated, the voltage between the gate and source of the N-type transistor 702 increases, and the value of the voltage VP increases. The voltage VP is input to the voltage comparator 622 illustrated in FIG. 8.

Figure 8:
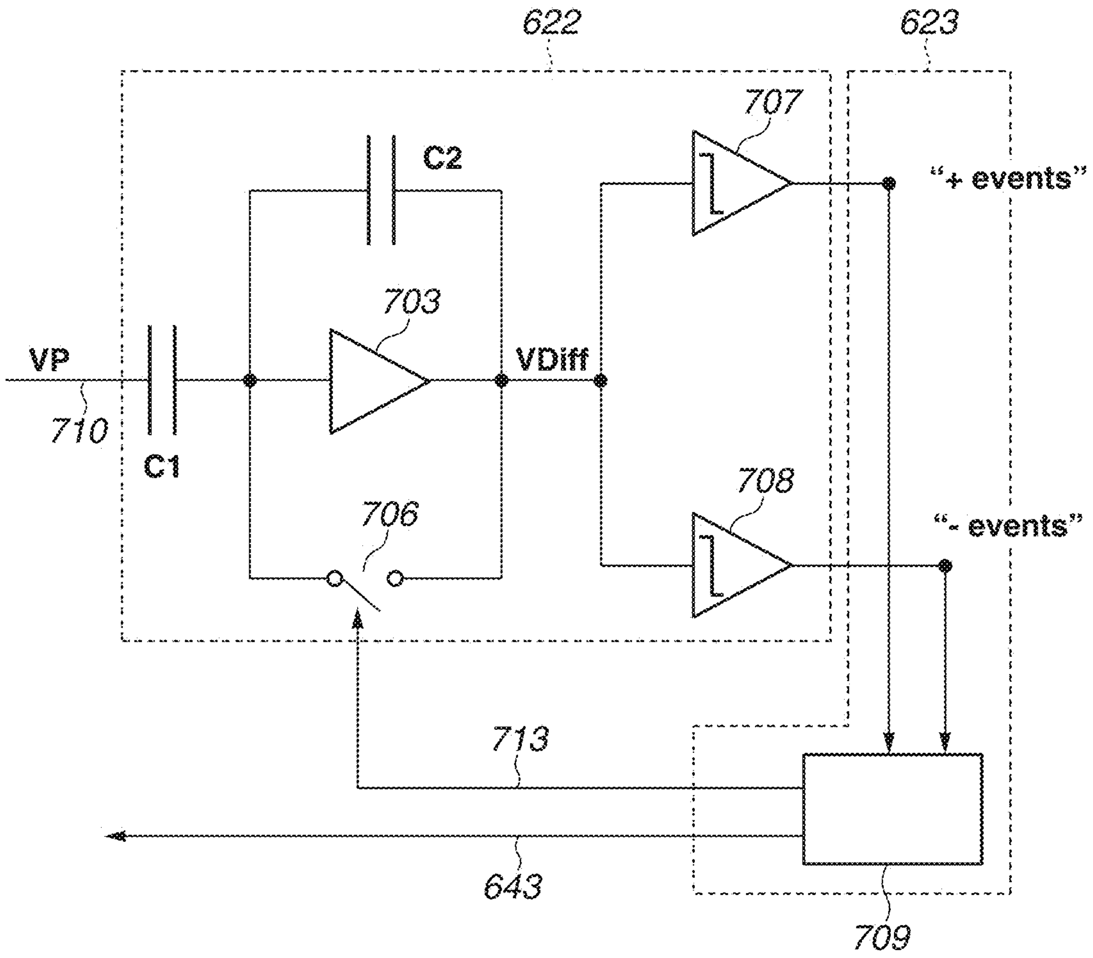
FIG. 8 is a diagram illustrating an example of a configuration of an event detection circuit according to the first exemplary embodiment.
Figure 9:
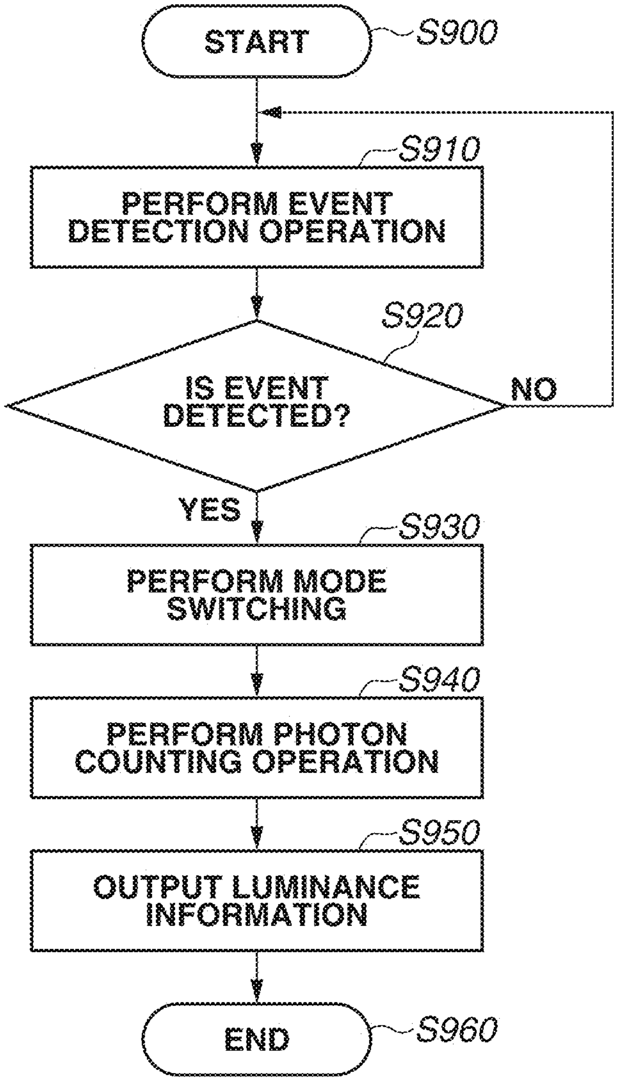
FIG. 9 is a flowchart illustrating an example of an operation of a solid-state image sensor according to the first exemplary embodiment.

FIG. 8 is a diagram illustrating an example of a configuration of the voltage comparator 622. A pixel output line 710 is provided with an amplifier 703 via an input capacitor C1. Further, feedback capacitor C2 is provided between the output and input of the amplifier 703. The amplifier 703 amplifies the voltage VP with an inverting gain determined by the ratio of the input capacitor C1 and the feedback capacitor C2, and the result is output as a signal $V_{Diff}$, which is a deviation from a specified voltage value (operating point after an occurrence of a reset event). The signal $V_{Diff}$ from the amplifier 703 is input to a first threshold comparator 707 and a second threshold comparator 708 connected in parallel. A reference signal is input to the first threshold comparator 707, and the first threshold comparator 707 determines whether the signal $V_{Diff}$ is above or below the reference signal value, and outputs "+events". Similarly, the reference signal is also input to the second threshold comparator 708, and the second threshold comparator 708 determines whether the signal $V_{Diff}$ is above or below the reference signal value, and outputs "−events". Specifically, "+events" and "−events" each indicate an amount of change in the amount of incident light.

Refer back to FIG. 9, in step S920 after the execution of the event detection operation, whether an event is detected is determined. Specifically, "+events" output from the first threshold comparator 707 in FIG. 8 and "−events" output from the second threshold comparator 708 are input to a control circuit 709, and whether an event is detected is determined. The event detection result is output to the mode control circuit 641 via the control line 643. In a case where "+events" output from the first threshold comparator 707 or "−events" output from the second threshold comparator 708 reaches a predetermined value, a reset signal is output from the control circuit 709. The reset signal controls a reset switch 706 via a control line 713. Consequently, the output and input nodes of the amplifier 703 are short-circuited, and the operating point of the amplifier 703 is reset. Whether an event is detected is determined based on the number of times and the duration "+events" or "−events" reaches the predetermined value.

Refer back to FIG. 9, in a case where no event is detected in step S920 (NO in step S920), in step S910, the event detection operation is executed again. Specifically, the PD 631 is repeatedly subjected to photon incidence until an event is detected.

On the other hand, in a case where an event is detected in step S920 (YES in step S920), the processing proceeds to step S930. Step S930 is a mode switching step, and the first switch 642 in FIG. 6 switches the connection destination of the mode control circuit 641 from the event detection circuit 620 to the photon counting circuit 610. Specifically, step S930 switches from an event detection mode (first mode) to a photon counting mode (second mode). Further, in step S930, the second switch 632 switches the anode potential of the PD 631 from V3 (e.g., 0 V) to V2 (e.g., −30 V). Specifically, the anode potential is switched to the negative potential. This switching causes a large reverse bias voltage greater than or equal to the breakdown voltage to be applied to the PD 631, to which a reverse bias voltage close to a PD operating range is previously applied, via the quenching element 612. In a case where light is incident on the PD 631, charges are generated, and the charges flow as an avalanche current in the photon counting circuit 610.

The third switch 613 is a switch that controls the electrical connection of the cathode of the PD 631 and a power supply voltage V1 (e.g., 1 V). In a case where the third switch 613 is in an on state, the PD 631 changes to a charged state, and thereafter the third switch 613 changes to an off state (non-charged state), and the PD 631 changes to a state that allows for avalanche multiplication. Specifically, in a case where a photon is incident in this state, an avalanche current flows. By control of the third switch 613 with a clock signal, in one embodiment, only one count is performed during a period in which the third switch 613 is maintained in the off state. This makes it possible to prevent illuminance levels and count numbers from reversing, facilitating signal correction.

Refer back to FIG. 9, in step S940 after the mode switching is performed, a photon counting operation is performed. The waveform shaping portion 614 in FIG. 6 shapes a waveform corresponding to a voltage drop based on the avalanche current and outputs a pulse signal. For example, an inverter circuit is used as the waveform shaping portion 614. The counter circuit 615 counts the number (number of times) of pulse signals output from the waveform shaping portion 614 and outputs the count value to the memory 616. The memory 616 outputs a signal corresponding to the count value in, for example, row-sequential order.

Refer back to FIG. 9, in step S950 after the photon counting operation is performed to count the number of incident photons within a predetermined exposure period (one frame), the count value as luminance information is output. Thereafter, in step S960, the driving operation of, for example, one-frame is ended. In a case where a plurality of frames of a moving image is to be acquired, the processing returns to step S900 again after step S950, and the exposure is repeated a plurality of times.

Alternatively, the processing may return to step S940 again to perform the photon counting operation continuously for a predetermined period.

The photon counting mode (second mode) has an issue of significantly high power consumption due to avalanche multiplication. Thus, a pixel circuit capable of switching between the event detection mode (first mode) and the photon counting mode (second mode) based on a situation may be incorporated to make it possible to provide a photoelectric conversion element capable of achieving the advantages of the two operation modes. Further, in a state without an event, performing the event detection operation repeatedly makes it possible to prevent avalanche multiplication in a state without a change on a screen.

Specifically, since unintended avalanche multiplication is not performed, power consumption reduction is achieved. Further, since the event detection and the photon counting are performed by the same photoelectric conversion element, event detection omissions are prevented while avoiding a decrease in photo counting resolution.

The anode potential of the PD 631 may be set to be shared, and power supply voltages of the photon counting circuit 610 and the event detection circuit 620 may be set to different values. For example, the anode potential of the PD 631 may be set to, for example, 0 V, and the power supply voltage of the photon counting circuit 610 and the power supply voltage of the event detection circuit 620 may be set to 30 V and 1 V, respectively. In this case, the second switch 632 is not necessary, and the first switch 642 alone can switch between the first mode and the second mode.

A structure of the second switch 632 will be described below with reference to FIGS. 10 and 11.

Figure 10:
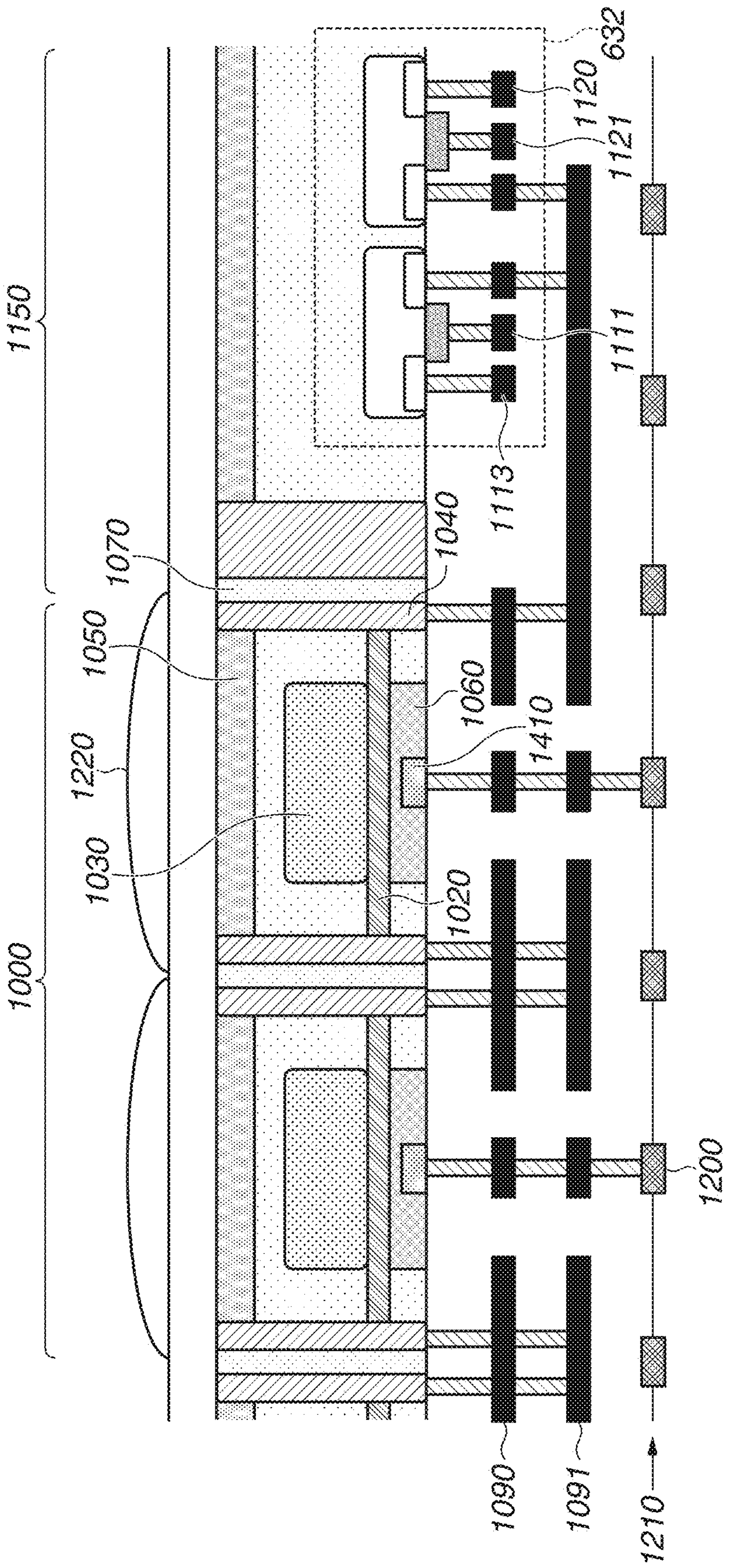
FIG. 10 is a cross-sectional view illustrating a schematic configuration of a second switch according to the first exemplary embodiment.

FIG. 10 is a cross-sectional view schematically illustrating a first substrate provided with PDs. Specifically, a pixel region 1000 provided with a plurality of PDs and a peripheral region 1150 arranged on the periphery of the pixel region 1000 (outside the pixel region 1000) are illustrated. The first substrate and a second substrate (not illustrated) are bonded together at a bonding surface 1210 via bonding portions 1200.

Each PD includes an N-type first semiconductor region 1410, a third semiconductor region 1030, and a sixth semiconductor region 1060. Further, a P-type second semiconductor region 1020, a fourth semiconductor region 1040, and a fifth semiconductor region 1050 are further included.

In the cross-section illustrated in FIG. 10, the N-type first semiconductor region 1410 is formed in the vicinity (first depth) of a second surface of the semiconductor substrate opposite a first surface of the semiconductor substrate. The first surface is a light incident surface. The N-type sixth semiconductor region 1060 is formed around the N-type first semiconductor region 1410. The P-type second semiconductor region 1020 is formed at a position (second depth) to overlap the first semiconductor region 1410 and the sixth semiconductor region 1060 in a planar view. The N-type third semiconductor region 1030 is arranged at a position (third depth) to overlap the second semiconductor region 1020 in a planar view, and an N-type semiconductor region is formed around the N-type third semiconductor region 1030. Further, the P-type fifth semiconductor region 1050 is formed on the first surface side.

The first semiconductor region 1410 is higher in N-type impurity concentration than the third semiconductor region 1030. A PN junction is formed between the P-type second semiconductor region 1020 and the N-type first semiconductor region 1410. By setting the impurity concentration of the second semiconductor region 1020 to be lower than the impurity concentration of the first semiconductor region 1410, the entire overlapping region of the second semiconductor region 1020 that overlaps a center of the first semiconductor region 1410 in a planar view becomes a depletion layer region. In this case, the potential difference between the first semiconductor region 1410 and the second semiconductor region 1020 is greater than the potential difference between the second semiconductor region 1020 and the sixth semiconductor region 1060. Furthermore, in a case where a high voltage (e.g., −30 V) is applied, the depletion layer region extends to a portion of the first semiconductor region 1410, and a strong electric field region is formed in the extended depletion layer region. The strong electric field causes avalanche multiplication in the depletion layer region extended to the portion of the first semiconductor region 1410, and a current based on amplified charges is output as a signal charge.

On the other hand, in a case where no high voltage is applied to the second semiconductor region 1020 (e.g., 0 V), no strong electric field region is formed, and no avalanche multiplication occurs. Even under this condition, since the reverse bias voltage is applied, the PD operation is performed.

In each PD illustrated in FIG. 10, in order to collect charges from a broader range into the first semiconductor region 1410, the third semiconductor region 1030 is formed to be greater in area than the first semiconductor region 1410. This makes it possible to relatively enlarge a charge collection region while relatively reducing an avalanche multiplication region, realizing PDs with high sensitivity and low dark count rate (DCR).

The area of the third semiconductor region 1030 may be reduced to approximately the same as the area of the sixth semiconductor region 1060.

Pixels are separated by trenches 1070, and the P-type fourth semiconductor region 1040 formed around each trench 1070 separates adjacent photoelectric conversion elements by a potential barrier. The photoelectric conversion elements are separated also by the potential of the fourth semiconductor region 1040, so that the trenches 1070 are not required as a pixel separation portion, and in a case where the trenches 1070 are provided, the depths and positions of the trenches 1070 are not limited to those in the structure illustrated in FIG. 10.

An anode potential is supplied to the second semiconductor region 1020 and the fifth semiconductor region 1050 via a contact connected electrically to the fourth semiconductor region 1040. Further, a cathode potential is supplied via a contact connected electrically to the first semiconductor region 1410.

A potential supplied to the fourth semiconductor region 1040 is also referred to as a well potential.

A wiring structure including a first wiring layer 1090 and a second wiring layer 1091 is provided to the surface (second surface) opposite the light incident surface of the semiconductor layer. Interlayer films that are insulating films are provided between the wiring structure and the semiconductor layer and between the first wiring layer 1090 and the second wiring layer 1091.

The second switch 632 provided to the peripheral region 1150 switches the anode potential of the PD. Specifically, in a case where a gate electrode 1111 is changed to an on state based on the second switch 632, a conductive line connected electrically to the fourth semiconductor region 1040 and a conductive line 1113 (e.g., –30 V) to which the power supply voltage V2 is supplied begin to conduct. Consequently, the voltage V2 is supplied to the anode potential of the PD. On the other hand, in a case where a gate electrode 1121 is changed to an on state based on the second switch 632, a conductive line connected electrically to the fourth semiconductor region 1040 and a conductive line 1120 (e.g., 0 V) to which the voltage V3 is supplied begin to conduct. Consequently, the voltage V3 is supplied to the anode potential of the PD.

Since the voltage V2 (e.g., –30 V) is a high voltage, arranging a conductive line on the second substrate and the wiring structure of the second substrate may affect elements provided to the second substrate. The present structure makes it possible to complete a conductive line for supplying a potential to the anode of the PD within the wiring structure provided to the first substrate, making it possible to reduce the foregoing affect.

The plurality of bonding portions 1200 is arranged to bond the first substrate and the second substrate together. The plurality of bonding portions 1200 is arranged, at equal intervals, with consideration for the bonding of the first substrate and the second substrate.

In this case, a dummy bonding portion 1200 that does not electrically connect elements of the first substrate and elements of the second substrate may be provided.

Figure 11:
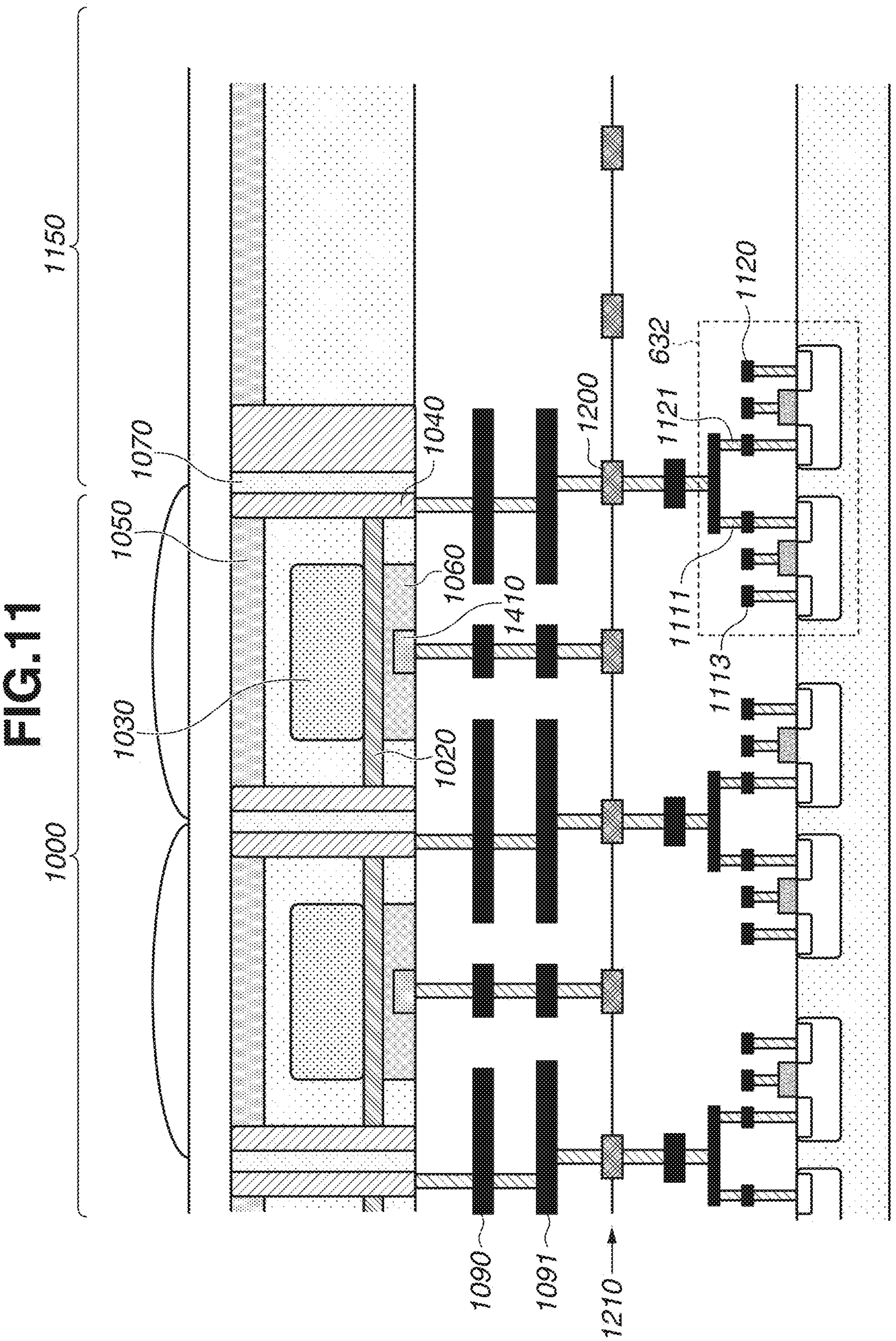
FIG. 11 is a cross-sectional view illustrating a schematic configuration of a second switch according to the first exemplary embodiment.

FIG. 11 is a cross-sectional view schematically illustrating a case where the second switch 632 is arranged on the second substrate. Arranging the second switch 632 on the second substrate makes it possible to arrange the second switch 632 for each of the plurality of PDs. This makes it possible to control the anode voltages applied to the PDs individually with the second switches 632 on the second substrate.

For example, it becomes possible to operate only the PDs in a specific region instead of operating the PDs of all pixels simultaneously.

Figure 12:
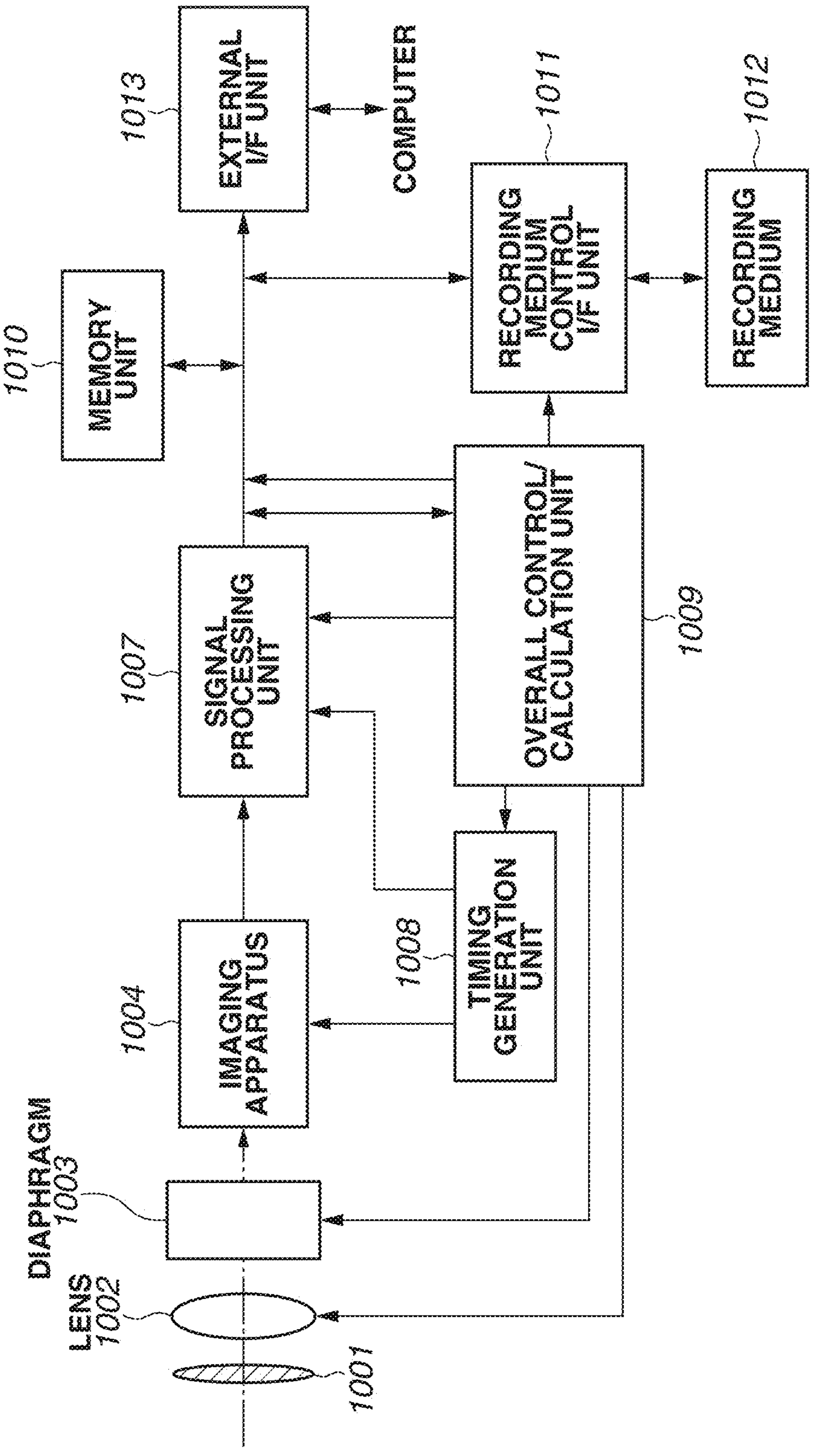
FIG. 12 is a functional block diagram illustrating a photoelectric conversion system according to a second exemplary embodiment.

A photoelectric conversion system according to a second exemplary embodiment will be described below with reference to FIG. 12. FIG. 12 is a block diagram illustrating a schematic configuration of the photoelectric conversion system according to the present exemplary embodiment.

The photoelectric conversion apparatus (imaging apparatus) according to the first exemplary embodiment is applicable to various photoelectric conversion system. Examples of applicable photoelectric conversion systems include digital still cameras, digital camcorders, surveillance cameras, copy machines, faxes, mobile phones, on-vehicle cameras, and observation satellites. Further, camera modules including optical systems such as lenses and imaging apparatuses are also included in the photoelectric conversion systems. FIG. 12 illustrates an example of a block diagram illustrating a digital still camera as an example.

The photoelectric conversion system illustrated as an example in FIG. 12 includes an imaging apparatus 1004 and a lens 1002. The imaging apparatus 1004 is an example of the photoelectric conversion apparatus, and the lens 1002 forms an optical image of a subject on the imaging apparatus 1004. The photoelectric conversion system further includes a diaphragm 1003 and a barrier 1001. The diaphragm 1003 adjusts the amount of light passing through the lens 1002, and the barrier 1001 protects the lens 1002. The lens 1002 and the diaphragm 1003 are an optical system for collecting light onto the imaging apparatus 1004. The imaging apparatus 1004 is the photoelectric conversion apparatus (imaging apparatus) according to any one of the exemplary embodiments and converts optical images formed by the lens 1002 into electrical signals.

The photoelectric conversion system further includes a signal processing unit 1007. The signal processing unit 1007 is an image generation unit that generates images by processing output signals output from the imaging apparatus 1004. The signal processing unit 1007 performs various types of correction and/or compression as needed and outputs image data. The signal processing unit 1007 may be formed on a semiconductor substrate on which the imaging apparatus 1004 is provided, or the signal processing unit 1007 may be formed on another semiconductor substrate different from the semiconductor substrate on which the imaging apparatus 1004 is provided. Further, the imaging apparatus 1004 and the signal processing unit 1007 may be formed on the same semiconductor substrate.

The photoelectric conversion system further includes a memory unit 1010 and an external interface unit (external I/F unit) 1013. The memory unit 1010 is used to store image data temporarily, and the external I/F unit 1013 is used to communicate with external computers. The photoelectric conversion system further includes a recording medium 1012, such as a semiconductor memory, and a recording medium control interface unit (recording medium control I/F unit) 1011. The recording medium 1012 is used to record and read imaged data, and the recording medium control I/F unit 1011 is used for recording to and reading from the recording medium 1012. The recording medium 1012 may be built in the photoelectric conversion system or may be attachable and detachable.

The photoelectric conversion system further includes an overall control/calculation unit 1009 and a timing generation unit 1008. The overall control/calculation unit 1009 controls various calculations and the entire digital still camera, and the timing generation unit 1008 outputs various timing signals to the imaging apparatus 1004 and the signal processing unit 1007. The timing signals may be input externally, and the photoelectric conversion system is to include at least the imaging apparatus 1004 and the signal processing unit 1007 configured to process output signals output from the imaging apparatus 1004.

The imaging apparatus 1004 outputs imaging signals to the signal processing unit 1007. The signal processing unit

1007 performs predetermined signal processing on the imaging signals output from the imaging apparatus 1004 and outputs image data. The signal processing unit 1007 generates images using the imaging signals.

As described above, the present exemplary embodiment makes it possible to realize a photoelectric conversion system to which the photoelectric conversion apparatus (imaging apparatus) according to any one of the exemplary embodiments is applied.

Figure 13A:
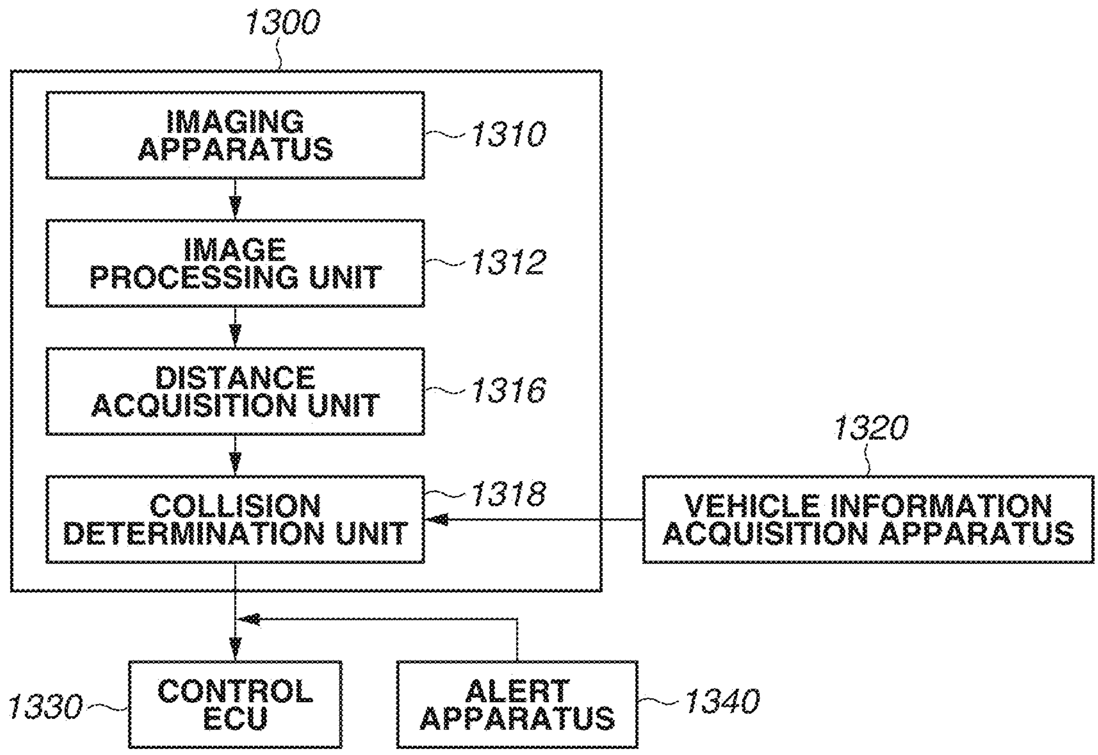
FIGS. 13A and 13B are functional block diagrams illustrating a photoelectric conversion system according to a third exemplary embodiment.
Figure 13B:
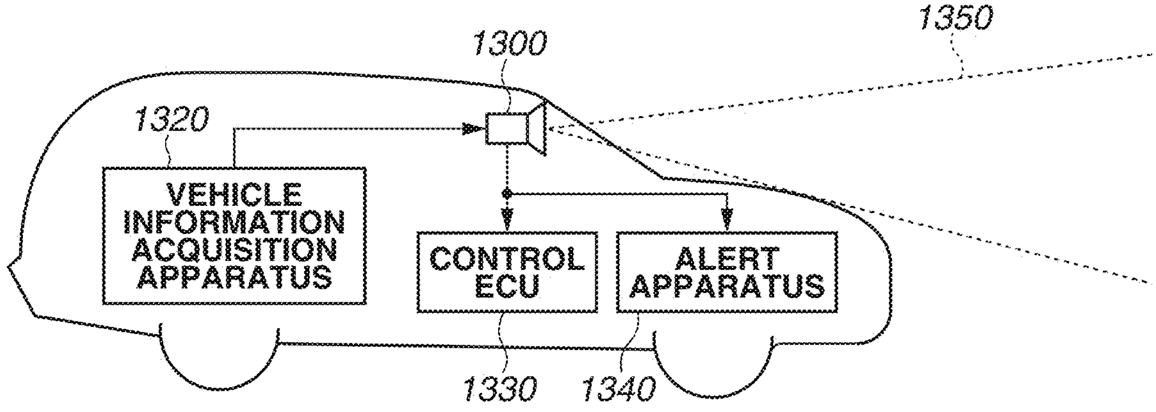

A photoelectric conversion system and a moving object according to a third exemplary embodiment will be described below with reference to FIGS. 13A and 13B. FIGS. 13A and 13B are diagrams illustrating configurations of the photoelectric conversion system and the moving object according to the present exemplary embodiment.

FIG. 13A illustrates an example of a photoelectric conversion system related to an on-vehicle camera. A photoelectric conversion system 1300 includes an imaging apparatus 1310. The imaging apparatus 1310 is one of the photoelectric conversion apparatuses (imaging apparatuses) according to the exemplary embodiments. The photoelectric conversion system 1300 includes an image processing unit 1312. The image processing unit 1312 performs image processing on a plurality of pieces of image data acquired by the imaging apparatus 1310. Further, the photoelectric conversion system 1300 includes a distance acquisition unit 1316 and a collision determination unit 1318. The distance acquisition unit 1316 calculates a distance to a target object, and the collision determination unit 1318 determines whether there is a likelihood of collision based on the calculated distance. The distance acquisition unit 1316 may acquire distance information about a ToF target object or may acquire distance information using parallax information. Specifically, distance information refers to information about parallax, information about defocus amount, and information about a distance to a target object. The collision determination unit 1318 may determine whether there is a likelihood of collision using any of the distance information described above. A distance information acquisition unit may be realized by dedicated hardware or a software module. Further, the distance information acquisition unit may be realized by a field programmable gate array (FPGA), an application specific integrated circuit (ASIC), or a combination thereof.

The photoelectric conversion system 1300 is connected to a vehicle information acquisition apparatus 1320 and is capable of acquiring vehicle information such as a vehicle speed, a yaw rate, and a steering angle. Further, the photoelectric conversion system 1300 is connected to a control electronic control unit (control ECU) 1330. The control ECU 1330 is a control apparatus that outputs control signals for generating braking force for the vehicle based on determination results of the collision determination unit 1318. Further, the photoelectric conversion system 1300 is also connected to an alert apparatus 1340. The alert apparatus 1340 alerts the driver based on the determination results of the collision determination unit 1318. For example, in a case where there is a high likelihood of collision based on the determination results of the collision determination unit 1318, the control ECU 1330 performs vehicle control to avoid collision and reduce damage by applying a brake, releasing an accelerator, and/or reducing engine output. The alert apparatus 1340 alerts the user by sounding an alert, such as a sound, displaying alert information on a screen of a car navigation system, and/or applying a vibration to a seatbelt and/or a steering wheel.

According to the present exemplary embodiment, images of the surroundings of the vehicle, such as the front or rear, are captured by the photoelectric conversion system 1300. FIG. 13B illustrates a photoelectric conversion system for capturing images of the front of the vehicle (imaging sensing area 1350). The vehicle information acquisition apparatus 1320 transmits instructions to the photoelectric conversion system 1300 or the imaging apparatus 1310. The foregoing configuration makes it possible to further improve the accuracy of distance measurement.

While the control for avoiding collisions with other vehicles is described above as an example, applications to control for automated driving by following another vehicle and control for automated driving to prevent drifting out of a lane are also feasible. Furthermore, the photoelectric conversion system is applicable to not only a vehicle, such as an automobile, but also a moving object (moving apparatus), such as a ship, an aircraft, or an industrial robot. The moving object includes either or both a drive power generation unit or (and) a rotary member. The drive power generation unit mainly generates drive power for use in moving the moving object, and the rotary member is mainly used to move the moving object. The drive power generation unit may be an engine or a motor. The rotary member may be a tire, a wheel, a ship propeller, or an aircraft propeller. Furthermore, applications are also feasible not only for moving objects but also for devices that widely use object recognition, such as intelligent transportation systems (ITS).

Figure 14:
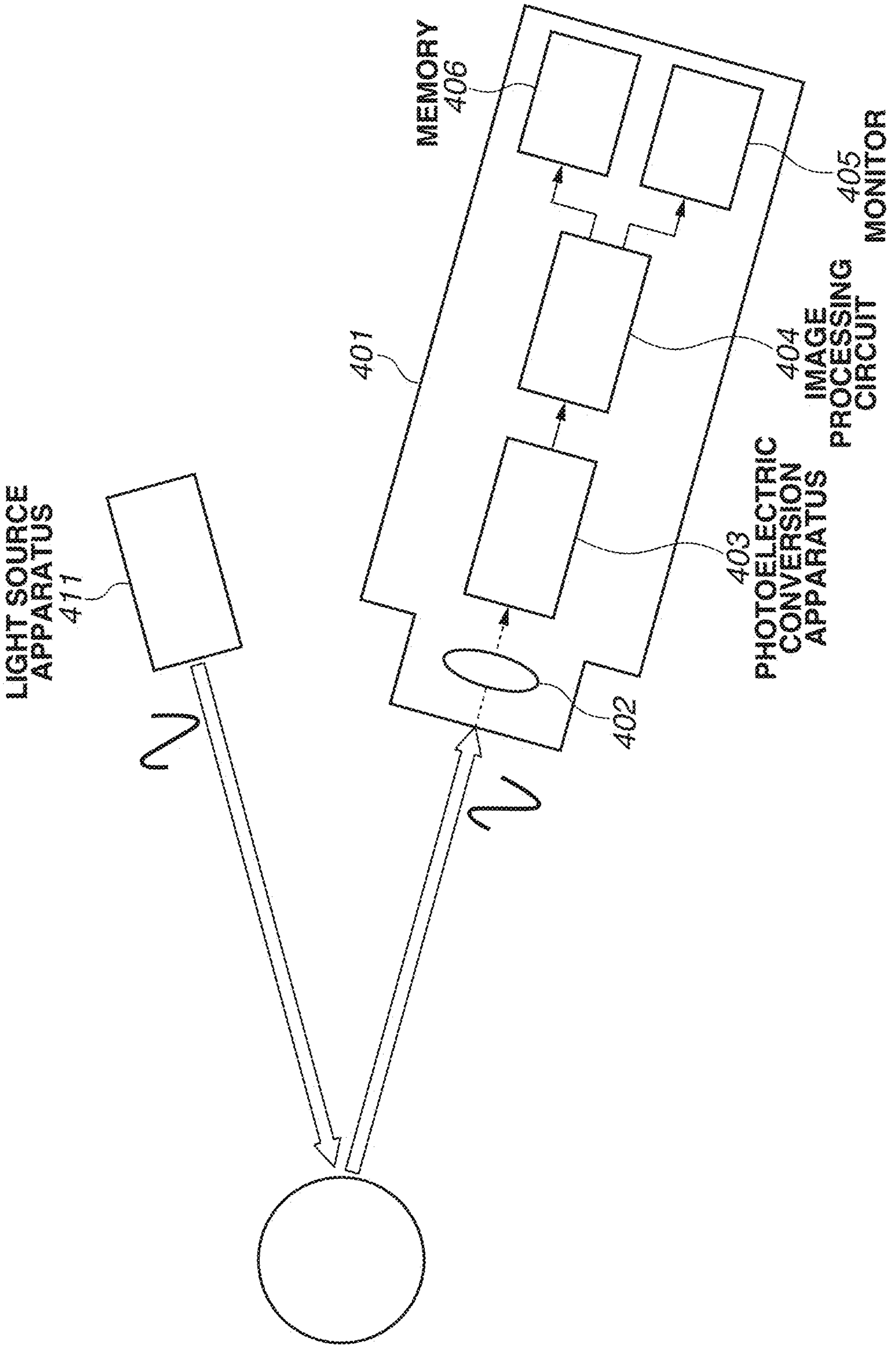
FIG. 14 is a functional block diagram illustrating a photoelectric conversion system according to a fourth exemplary embodiment.

A photoelectric conversion system according to a fourth exemplary embodiment will be described below with reference to FIG. 14. FIG. 14 is a block diagram illustrating an example of a configuration of a distance image sensor that is a photoelectric conversion system according to the present exemplary embodiment.

As illustrated in FIG. 14, a distance image sensor 401 includes an optical system 402, a photoelectric conversion apparatus 403, an image processing circuit 404, a monitor 405, and a memory 406. Further, the distance image sensor 401 is capable of acquiring a distance image corresponding to a distance to a subject by receiving light (modulated light, pulse light) emitted from a light source apparatus 411 to the subject and reflected from a surface of the subject.

The optical system 402 is composed of one or more lenses and guides image light (incident light) from the subject to the photoelectric conversion apparatus 403 to form an image on a light receiving surface (sensor portion) of the photoelectric conversion apparatus 403.

The photoelectric conversion apparatus according to any one of the exemplary embodiments is applied to the photoelectric conversion apparatus 403, and a distance signal indicating a distance calculated from a received light signal output from the photoelectric conversion apparatus 403 is supplied to the image processing circuit 404.

The image processing circuit 404 performs image processing to form a distance image based on the distance signal supplied from the photoelectric conversion apparatus 403. Then, the distance image (image data) obtained by the image processing is supplied to the monitor 405 and displayed or is supplied to the memory 406 and stored (recorded).

By applying the photoelectric conversion apparatus to the distance image sensor 401 configured as described above, pixel characteristics improve, and it becomes possible for the distance image sensor 401 to acquire more accurate distance images, for example.

Figure 15:
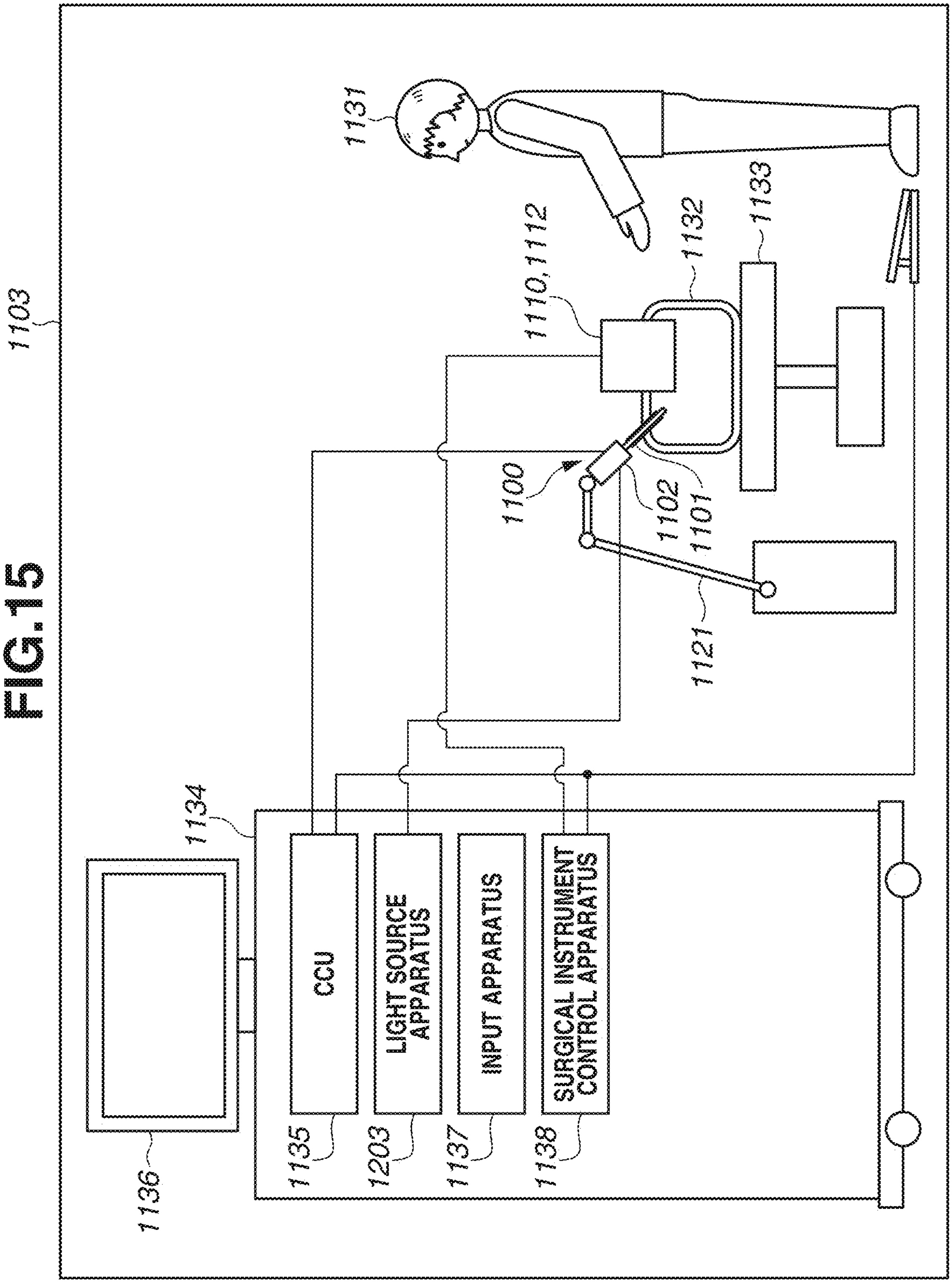
FIG. 15 is a functional block diagram illustrating a photoelectric conversion system according to a fifth exemplary embodiment.

A photoelectric conversion system according to a fifth exemplary embodiment will be described below with reference to FIG. 15. FIG. 15 is a diagram illustrating an example of a schematic configuration of an endoscopic surgery system that is a photoelectric conversion system according to the present exemplary embodiment.

FIG. 15 illustrates how a surgeon (doctor) 1131 performs surgery on a patient 1132 on a patient bed 1133 using an endoscopic surgery system 1103. As illustrated, the endoscopic surgery system 1103 includes an endoscope 1100, a surgical instrument 1110, and a cart 1134 carrying various apparatuses for endoscopic surgery.

The endoscope 1100 is composed of a lens barrel 1101 and a camera head 1102. The lens barrel 1101 is inserted into a body cavity of the patient 1132 so that a predetermined length from a tip of the lens barrel 1101 is inside the body cavity. The camera head 1102 is connected to a proximal end of the lens barrel 1101. While the endoscope 1100 in the illustrated example is configured as a so-called rigid scope with the lens barrel 1101 that is rigid, the endoscope 1100 may be configured as a so-called flexible scope with a flexible lens barrel.

The tip of the lens barrel 1101 includes an opening portion into which an objective lens is fitted. A light source apparatus 1203 is connected to the endoscope 1100, and light generated by the light source apparatus 1203 is guided to the tip of the lens barrel 1101 by a light guide extending inside of the lens barrel 1101 and is emitted to an observation target within the body cavity of the patient 1132 via the objective lens. The endoscope 1100 may be a straight endoscope, an angled-view endoscope, or a side-view endoscope.

An optical system and a photoelectric conversion apparatus are provided inside of the camera head 1102, and the optical system focuses reflected light (observation light) from the observation target onto the photoelectric conversion apparatus. The photoelectric conversion apparatus photoelectrically converts the observation light, and an electrical signal corresponding to the observation light, i.e., an image signal corresponding to an observation image, is generated. The photoelectric conversion apparatus (imaging apparatus) according to any one of the exemplary embodiments may be used as the photoelectric conversion apparatus. The image signal is transmitted as raw data to a camera control unit (CCU) 1135.

The CCU 1135 is composed of a central processing unit (CPU) and a graphics processing unit (GPU) and comprehensively controls operations of the endoscope 1100 and a display apparatus 1136. Furthermore, the CCU 1135 receives the image signal from the camera head 1102 and performs various types of image processing, such as development processing (demosaicing processing), on the image signal to display an image based on the image signal.

The display apparatus 1136 is controlled by the CCU 1135 to display the image based on the image signal having undergone the image processing by the CCU 1135.

The light source apparatus 1203 is composed of, for example, a light source such as a light emitting diode (LED) and provides illumination light for imaging a surgical area to the endoscope 1100.

An input apparatus 1137 is an input interface for the endoscopic surgery system 1103. A user can input various types of information and instructions to the endoscopic surgery system 1103 via the input apparatus 1137.

A surgical instrument control apparatus 1138 controls the operation of an energy-based surgical instrument 1112 for burning tissue, cutting, or sealing blood vessels.

The light source apparatus 1203 for providing illumination light for imaging a surgical area to the endoscope 1100 may be composed of, for example, a LED, a laser light source, or a white light source composed of a combination thereof. In a case where a white light source is composed of a combination of red, green, and blue (RGB) laser light sources, since it is possible to control output intensities and output timings of individual colors (individual wavelengths) with high accuracy, the light source apparatus 1203 can perform white balance adjustment on captured images. Further, in this case, images corresponding to RGB can be captured using time division by illuminating the observation target with laser light from each of the RGB laser light sources using time division and controlling driving of an image sensor of the camera head 1102 in synchronization with the illumination timings. This method makes it possible to obtain color images without providing a color filter to the image sensor.

Further, driving of the light source apparatus 1203 may be controlled to change an output light intensity at predetermined intervals. An image with a high dynamic range without underexposure or overexposure can be generated by controlling driving of the image sensor of the camera head 1102 in synchronization with the timings of light intensity changes, acquiring images using time division, and combining the images together.

Further, the light source apparatus 1203 may be configured to supply light of a predetermined wavelength range for specialized light observation. The specialized light observation utilizes, for example, the wavelength dependence of light absorption in biological tissues. Specifically, by irradiation with light of a narrower wavelength range compared to illumination light (i.e., white light) for normal observation, images of predetermined tissues, such as mucosal blood vessels, are captured with a high contrast.

Alternatively, fluorescence observation may be performed to obtain images using fluorescence generated by irradiation with excitation light in the specialized light observation. In the fluorescence observation, body tissue may be irradiated with excitation light to observe fluorescence from the body tissue, or a reagent such as Indocyanine Green (ICG) may be injected locally into body tissue and the body tissue may be irradiated with excitation light corresponding to a fluorescence wavelength of the reagent to obtain a fluorescence image. The light source apparatus 1203 may be configured to supply light with a narrow wavelength range and/or excitation light for the specialized light observation.

Figure 16A:
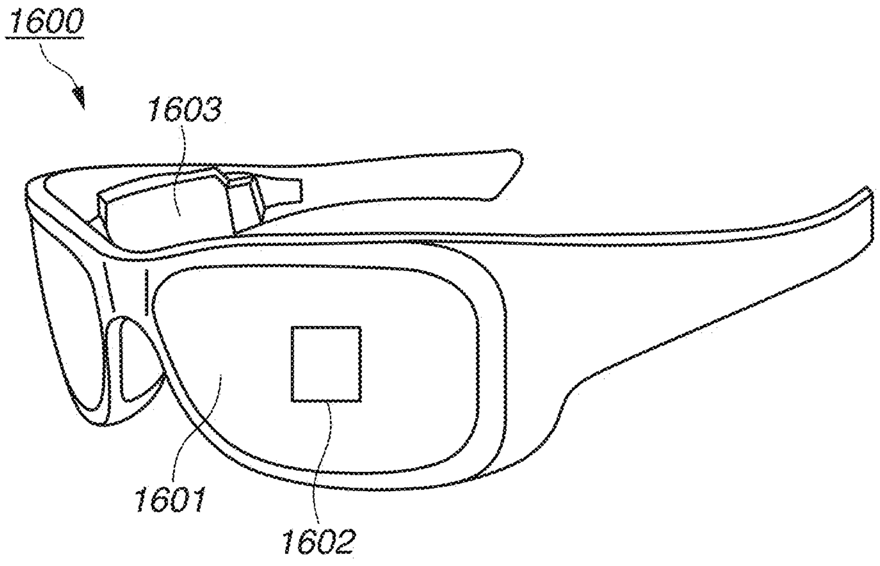
FIGS. 16A and 16B are functional block diagrams illustrating a photoelectric conversion system according to a sixth exemplary embodiment.

A photoelectric conversion system according to a sixth exemplary embodiment will be described below with reference to FIGS. 16A and 16B. FIG. 16A illustrates glasses 1600 (smart glasses). The glasses 1600 are a photoelectric conversion system according to the present exemplary embodiment. The glasses 1600 include a photoelectric conversion apparatus 1602. The photoelectric conversion apparatus 1602 is the photoelectric conversion apparatus (imaging apparatus) according to any one of the exemplary embodiments. Further, a display apparatus including a light emitting device, such as an organic LED (OLED) or LED, may be provided to a rear surface of a lens 1601. One photoelectric conversion apparatus 1602 may be provided, or more than one photoelectric conversion apparatus 1602 may be provided. Further, a plurality of types of photoelectric conversion apparatuses may be used in combination. The position for arranging the photoelectric conversion apparatus 1602 is not limited to the position illustrated in FIG. 16A.

The glasses 1600 further include a control apparatus 1603. The control apparatus 1603 functions as a power supply that supplies power to the photoelectric conversion apparatus 1602 and the display apparatus. Further, the control apparatus 1603 controls operations of the photoelectric conversion apparatus 1602 and the display apparatus. An optical system for focusing light onto the photoelectric conversion apparatus 1602 is formed on the lens 1601.

Figure 16B:
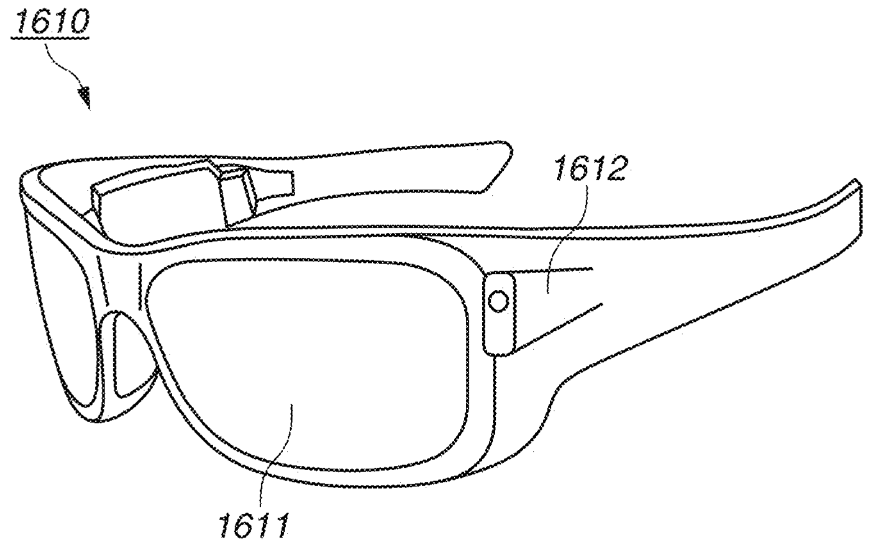

FIG. 16B illustrates glasses 1610 (smart glasses) related to an application example. The glasses 1610 include a control apparatus 1612, and the control apparatus 1612 includes a photoelectric conversion apparatus corresponding to the photoelectric conversion apparatus 1602 and a display apparatus. An optical system for projecting light emitted from the photoelectric conversion apparatus and the display apparatus in the control apparatus 1612 is formed on a lens 1611, and an image is projected onto the lens 1611. The control apparatus 1612 functions as a power supply that supplies power to the photoelectric conversion apparatus and the display apparatus, and controls operations of the photoelectric conversion apparatus and the display apparatus. The control apparatus 1612 may include a line-of-sight detection unit that detects a line of sight of the wearer. The line-of-sight detection may use infrared rays. An infrared light emitting unit emits infrared light to an eyeball of a user gazing at a display image. An imaging unit including a light receiving element detects reflected light of the emitted infrared light from the eyeball, and captured images of the eyeball are obtained. By including a reduction unit for reducing light from the infrared light emitting unit to a display unit in a planar view, a decrease in image quality is prevented.

The line of sight of the user on the display image is detected from the captured images of the eyeball that is obtained by imaging using infrared light. A publicly-known method is applicable to the line-of-sight detection using the captured images of the eyeball. An example of a method that can be used is a line-of-sight detection method based on Purkinje images formed by the reflection of illumination light from the surfaces of the cornea.

More specifically, a line-of-sight detection process based on a pupil-corneal reflex method is performed. The line of sight of the user is detected by calculating a line-of-sight vector representing an orientation (rotation angle) of the eyeball using the pupil-corneal reflex method based on pupil and Purkinje images included in the captured images of the eyeball.

The display apparatus according to the present exemplary embodiment includes a photoelectric conversion apparatus including a light receiving element, and a display image on the display apparatus may be controlled based on line-of-sight information about the user from the photoelectric conversion apparatus.

Specifically, the display apparatus determines a first visual field region at which the user gazes and a second visual field region other than the first visual field region based on the line-of-sight information. The first visual field region and the second visual field region may be determined by a control apparatus of the display apparatus, or the first visual field region and the second visual field region that are determined by an external control apparatus may be received. Display resolutions in a display region of the display apparatus may be controlled so that the display resolution of the first visual field region becomes higher than the display resolution of the second visual field region. Specifically, the resolution of the second visual field region may be controlled to be lower than the resolution of the first visual field region.

Further, the display region may include a first display region and a second display region different from the first display region, and a region with a high priority may be determined from the first display region and the second display region based on the line-of-sight information. The first display region and the second display region may be determined by the control apparatus of the display apparatus, or the first display region and the second display region that are determined by an external control apparatus may be received. The resolution of the region with a high priority may be controlled to be higher than the resolution of the region other than the region with a high priority. Specifically, the resolution of the region with a relatively low priority may be controlled to be low.

The determination of the first visual field region and the region with a high priority may be performed using AI. This AI may be a model configured to estimate an angle of the line of sight and a distance to an object at which the line of sight is directed from the images of the eyeball using the images of the eyeball and a direction in which the eyeball captured in the images has been actually gazing as training data. A program of the AI may be stored in the display apparatus, the photoelectric conversion apparatus, or an external apparatus. In a case where the program is stored in an external apparatus, the program is transmitted to the display apparatus via communication.

In a case where display control is performed based on visual detection, the present exemplary embodiment is suitably applicable to smart glasses further including a photoelectric conversion apparatus configured to capture external images. The smart glasses are capable of displaying captured external information in real time.

The photoelectric conversion apparatuses and the photoelectric conversion systems described above are applicable to any electronic equipment such as a smartphone or a tablet.

Figure 17A:
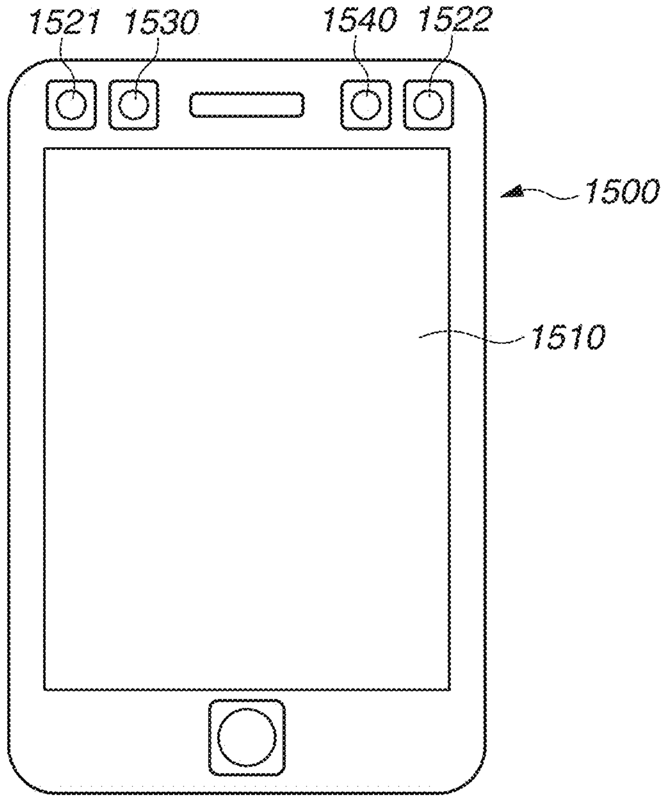
FIGS. 17A and 17B are functional block diagrams illustrating a photoelectric conversion system according to a seventh exemplary embodiment.
Figure 17B:
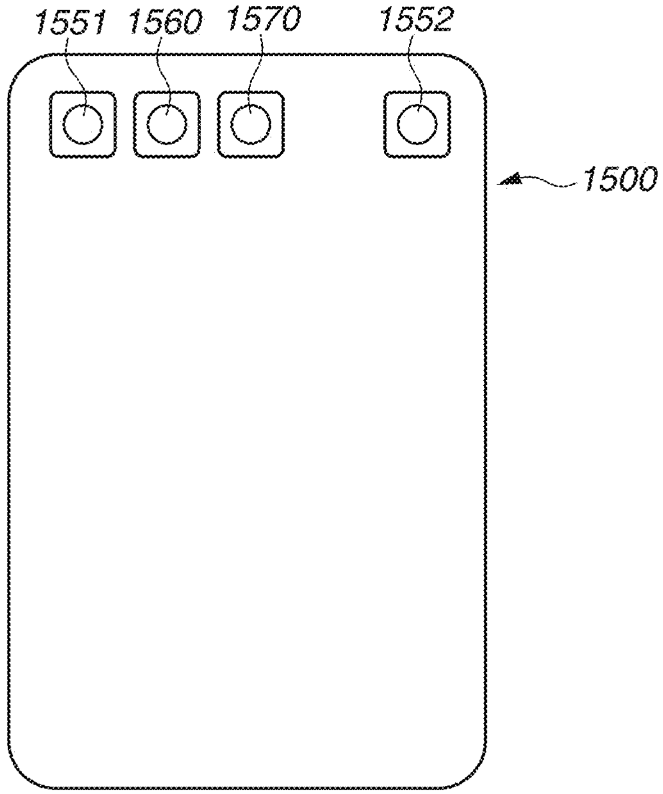

FIGS. 17A and 17B are diagrams illustrating an example of electronic equipment 1500 including a photoelectric conversion apparatus. FIG. 17A illustrates the front side of the electronic equipment 1500, and FIG. 17B illustrates the rear side of the electronic equipment 1500.

As illustrated in FIG. 17A, a display 1510 is arranged at a center of the front side of the electronic equipment 1500 and displays images. Further, front cameras 1521 and 1522 using the photoelectric conversion apparatus, an infrared (IR) light source 1530 configured to emit infrared light, and a visible light source 1540 configured to emit visible light are arranged along an upper edge of the front side of the electronic equipment 1500.

Further, as illustrated in FIG. 17B, rear cameras 1551 and 1552 using the photoelectric conversion apparatus, an IR light source 1560 configured to emit infrared light, and a visible light source 1570 configured to emit visible light are arranged along an upper edge of the rear side of the electronic equipment 1500.

Application of the photoelectric conversion apparatus to the electronic equipment 1500 configured as described above enables the electronic equipment 1500 to, for example, capture images with higher quality. The photoelectric conversion apparatus is also applicable to other types of electronic equipment such as infrared sensors, distance measurement sensors using an active infrared light source, security cameras, and personal or biometric authentication cameras. This makes it possible to improve the accuracy and performance of the electronic equipment.

Figure 18:
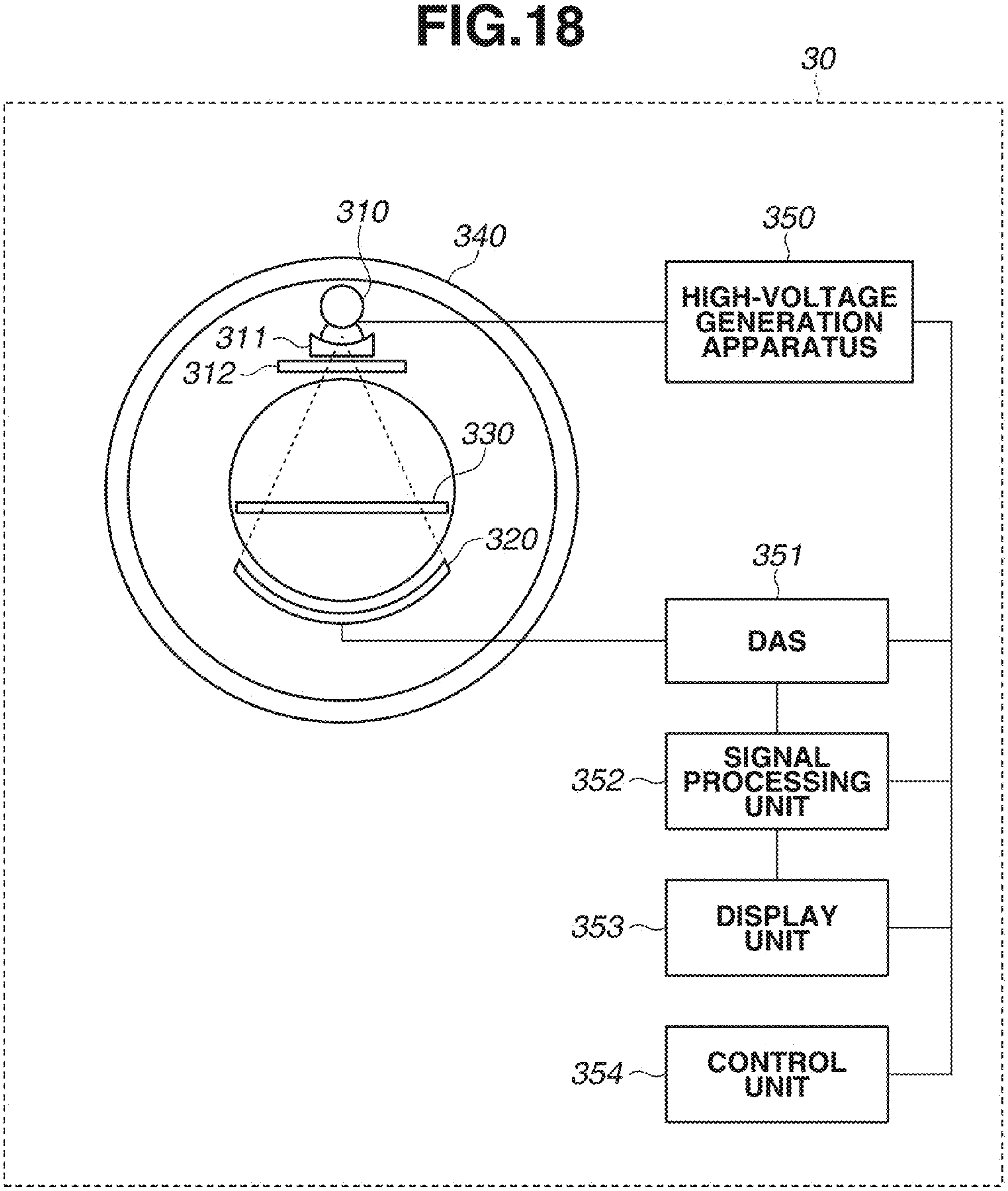
FIG. 18 is a functional block diagram illustrating a photoelectric conversion system according to an eighth exemplary embodiment.

FIG. 18 is a block diagram illustrating an X-ray computed tomography (X-ray CT) apparatus according to an eighth exemplary embodiment. As described above, a semiconductor apparatus according to the first exemplary embodiment is applicable to a detector of the X-ray CT apparatus. An X-ray CT apparatus 30 according to the present exemplary embodiment includes an X-ray generation portion 310, a wedge 311, a collimator 312, an X-ray detection portion 320, a top plate 330, a rotary frame 340, and a high-voltage generation apparatus 350. Further, the X-ray CT apparatus 30 includes a data acquisition apparatus (data acquisition system (DAS)) 351, a signal processing unit 352, a display unit 353, and a control unit 354.

The X-ray generation portion 310 is composed of, for example, a vacuum tube that generates X-rays. A high voltage and filament current from the high-voltage generation apparatus 350 are supplied to the vacuum tube of the X-ray generation portion 310. X-rays are generated by the emission of thermal electrons from the cathode (filament) toward the anode (target).

The wedge 311 is a filter that adjusts the amount of X-rays emitted from the X-ray generation portion 310. The wedge 311 reduces the amount of X-rays so that the X-rays emitted from the X-ray generation portion 310 to a subject creates a predetermined distribution. The collimator 312 is composed of a lead plate for narrowing an irradiation range of the X-rays transmitted through the wedge 311. The X-rays generated by the X-ray generation portion 310 are shaped into a cone beam through the collimator 312, and the subject on the top plate 330 is irradiated with the shaped X-rays.

The X-ray detection portion 320 is composed using the semiconductor apparatus according to the first exemplary embodiment. The X-ray detection portion 320 detects X-rays transmitted from the X-ray generation portion 310 through the subject and outputs a signal corresponding to the amount of X-rays to the DAS 351.

The rotary frame 340 forms a ring shape and is configured to be rotatable. In the rotary frame 340, the X-ray generation portion 310 (the wedge 311, the collimator 312) and the X-ray detection portion 320 are arranged opposite each other. The X-ray generation portion 310 and the X-ray detection portion 320 are rotatable with the rotary frame 340.

The high-voltage generation apparatus 350 includes a boost circuit and outputs a high voltage to the X-ray generation portion 310. The DAS 351 includes an amplification circuit and an analog/digital (A/D) conversion circuit and outputs a signal from the X-ray detection portion 320 as digital data to the signal processing unit 352.

The signal processing unit 352 includes a CPU, a read-only memory (ROM), and a random access memory (RAM) and is capable of performing image processing on digital data. The display unit 353 includes a flat-panel display apparatus and is capable of displaying X-ray images. The control unit 354 includes a CPU, a ROM, and a RAM and controls operations of the entire X-ray CT apparatus 30.

Figure 19A:
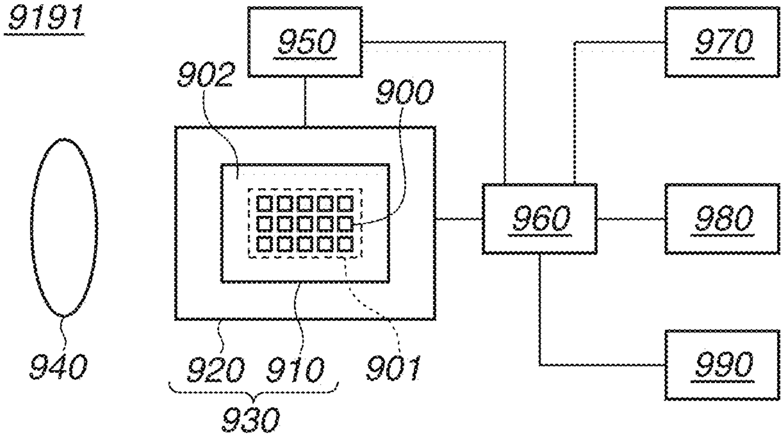
FIGS. 19A to 19C are functional block diagrams illustrating a photoelectric conversion system according to a ninth exemplary embodiment.

A ninth exemplary embodiment is also applicable to the first exemplary embodiment. FIG. 19A is a schematic diagram illustrating equipment 9191 including a semiconductor apparatus 930 according to the present exemplary embodiment. The semiconductor apparatus 930 may use the photoelectric conversion apparatus (imaging apparatus) according to any one of the exemplary embodiments. The equipment 9191 including the semiconductor apparatus 930 will be described in detail below. The semiconductor apparatus 930 may include a semiconductor device 910. The semiconductor apparatus 930 may include a package 920 for housing the semiconductor device 910 in addition to the semiconductor device 910. The package 920 may include a base member to which the semiconductor device 910 is fixed and a lid member, such as glass, opposite the semiconductor device 910. The package 920 may further include bonding members, such as bonding wires and bumps, for connecting terminals provided to the base member and terminals provided to the semiconductor device 910.

The equipment 9191 may include at least any of an optical apparatus 940, a control apparatus 950, a processing apparatus 960, a display apparatus 970, a storage apparatus 980, and a mechanical apparatus 990. The optical apparatus 940 corresponds to the semiconductor apparatus 930. The optical apparatus 940 includes an optical system, such as a lens, a shutter, and a mirror, for guiding light to the semiconductor apparatus 930. The control apparatus 950 controls the semiconductor apparatus 930. The control apparatus 950 is a semiconductor apparatus such as an ASIC.

The processing apparatus 960 processes signals output from the semiconductor apparatus 930. The processing apparatus 960 is a semiconductor apparatus, such as a CPU or an ASIC, for forming an analog front end (AFE) or a digital front end (DFE). The display apparatus 970 is an electroluminescent (EL) display apparatus or a liquid crystal display apparatus that displays information (image) acquired by the semiconductor apparatus 930. The storage apparatus 980 is a magnetic device or a semiconductor device that stores information (image) acquired by the semiconductor apparatus 930. The storage apparatus 980 is a volatile memory, such as a static RAM (SRAM) or a dynamic RAM (DRAM), or a non-volatile memory, such as a flash memory or a hard disk drive.

The mechanical apparatus 990 includes movable or propulsion parts such as motors and engines. The equipment 9191 displays signals output from the semiconductor apparatus 930 on the display apparatus 970 and/or transmits the signals externally via a communication apparatus (not illustrated) of the equipment 9191. Thus, desirably, the equipment 9191 further includes the storage apparatus 980 and the processing apparatus 960 separately from a storage circuit and a calculation circuit of the semiconductor apparatus 930. The mechanical apparatus 990 may be controlled based on signals output from the semiconductor apparatus 930.

Further, the equipment 9191 is applicable to electronic equipment such as an information terminal (e.g., smartphone, wearable terminal) with an imaging function or a camera (e.g., interchangeable lens camera, compact camera, video camera, surveillance camera). The mechanical apparatus 990 of a camera is capable of driving components of the optical apparatus 940 for zooming, focusing, and shutter operations. Further, the mechanical apparatus 990 of the camera is capable of moving the semiconductor apparatus 930 for image stabilization operations.

Further, the equipment 9191 may be transport equipment such as a vehicle, a ship, or a flying object (such as a drone or aircraft). The mechanical apparatus 990 of transport equipment may be used as a moving apparatus. The equipment 9191 as transport equipment is suitable to transport the semiconductor apparatus 930 or to assist with driving (piloting) and/or automate driving (piloting) using imaging functions. The processing apparatus 960 for assisting with driving (piloting) and/or automating driving (piloting) is capable of performing processes for operating the mechanical apparatus 990 as a moving apparatus based on information acquired by the semiconductor apparatus 930. Alternatively, the equipment 9191 may be medical equipment, such as an endoscope, measurement equipment, such as a distance measurement sensor, analysis equipment, such as an electron microscope, office equipment, such as a copy machine, or industrial equipment, such as a robot.

The exemplary embodiments described above make it possible to achieve favorable pixel characteristics. This makes it possible to enhance the value of the semiconductor apparatus. The phrase "to enhance the value" herein refers to at least any of addition of a function, improvement in performance, improvement in characteristics, improvement in reliability, improvement in manufacturing yield, environmental impact reduction, cost reduction, size reduction, and weight reduction.

Thus, use of the semiconductor apparatus 930 according to the present exemplary embodiment in the equipment 9191 makes it possible to also enhance the value of the equipment 9191. For example, the semiconductor apparatus 930 may be incorporated into transport equipment to achieve excellent performance in capturing external images of the transport equipment and in measuring external environments. Thus, incorporating the semiconductor apparatus according to the present exemplary embodiment into transport equipment is advantageous for enhancement of the performance of the transport equipment in manufacturing and selling the transport equipment. The semiconductor apparatus 930 is favorable especially for transport equipment that is subjected to driving assist and/or automates driving using information acquired by the semiconductor apparatus 930.

Figure 19B:
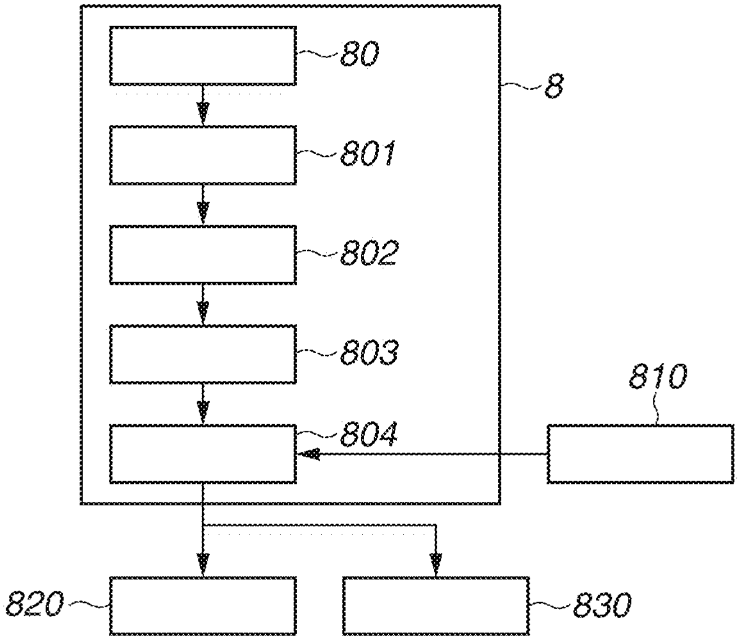

Further, a photoelectric conversion system and a moving object according to the present exemplary embodiment will be described below with reference to FIGS. 19A to 19C.

FIG. 19A illustrates an example of a photoelectric conversion system related to an on-vehicle camera. A photoelectric conversion system 8 includes a photoelectric conversion apparatus 80. The photoelectric conversion apparatus 80 is one of the photoelectric conversion apparatuses (imaging apparatuses) according to the exemplary embodiments. The photoelectric conversion system 8 includes an image processing unit 801 and a parallax acquisition unit 802. The image processing unit 801 performs image processing on a plurality of pieces of image data acquired by the photoelectric conversion apparatus 80, and the parallax acquisition unit 802 calculates parallax (phase difference between parallax images) from the plurality of pieces of image data acquired by the photoelectric conversion system 8. The photoelectric conversion system 8 herein may include an optical system (not illustrated), including, for example, a lens, a shutter, and a mirror, to guide light to the photoelectric conversion apparatus 80.

Further, a plurality of photoelectric conversion portions that is substantially conjugate to the pupil of the optical system may be arranged on the pixels of the photoelectric conversion apparatus 80. For example, the plurality of photoelectric conversion portions that is substantially conjugate to the pupil is arranged to correspond to one microlens. The plurality of photoelectric conversion portions receives light beams transmitted through different positions of the pupil of the optical system, and the photoelectric conversion apparatus 80 outputs image data corresponding to the light beams transmitted through the different positions. Then, the parallax acquisition unit 802 may perform parallax calculation using the output image data. Further, the photoelectric conversion system 8 includes a distance acquisition unit 803 and a collision determination unit 804. The distance acquisition unit 803 calculates a distance to a target object based on the calculated parallax, and the collision determination unit 804 determines whether there is a likelihood of collision based on the calculated distance. The parallax acquisition unit 802 and the distance acquisition unit 803 here are an example of a distance information acquisition unit configured to acquire information about a distance to a target object. Specifically, distance information refers to information about parallax, information about defocus amount, and information about a distance to a target object. The collision determination unit 804 may determine whether there is a likelihood of collision using any of the distance information described above. Distance information may be acquired using ToF. The distance information acquisition unit may be realized by dedicated hardware or a software module. Further, the distance information acquisition unit may be realized by a FPGA, an ASIC, or a combination thereof.

The photoelectric conversion system 8 is connected to a vehicle information acquisition apparatus 810 and is capable of acquiring vehicle information such as a vehicle speed, a yaw rate, and a steering angle. Further, the photoelectric conversion system 8 is connected to a control ECU 820. The control ECU 820 is a control apparatus that outputs control signals for generating braking force for the vehicle based on determination results of the collision determination unit 804. Further, the photoelectric conversion system 8 is also connected to an alert apparatus 830. The alert apparatus 830 alerts the driver based on the determination results of the collision determination unit 804. For example, in a case where there is a high likelihood of collision based on the determination results of the collision determination unit 804, the control ECU 820 performs vehicle control to avoid collision and reduce damage by applying a brake, releasing an accelerator, and/or reducing engine output. The alert apparatus 830 alerts the user by sounding an alert, such as a sound, displaying alert information on a screen of a car navigation system, and/or applying a vibration to a seatbelt and/or a steering wheel.

According to the present exemplary embodiment, images of the surroundings of the vehicle, such as the front or rear, are captured by the photoelectric conversion system 8.

Figure 19C:
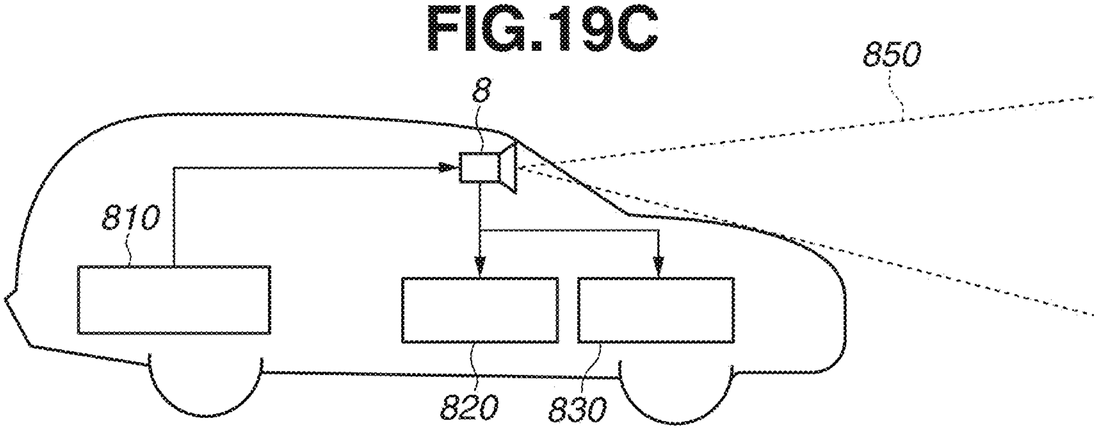

FIG. 19C illustrates a photoelectric conversion system for capturing images of the front of the vehicle (image sensing area 850). The vehicle information acquisition apparatus 810 transmits instructions to the photoelectric conversion system 8 or the photoelectric conversion apparatus 80. The foregoing configuration makes it possible to further improve the accuracy of distance measurement.

While the control for avoiding collisions with other vehicles is described above as an example, applications to control for automated driving by following another vehicle and control for automated driving to prevent drifting out of a lane are also feasible. Furthermore, the photoelectric conversion system 8 is applicable to not only a vehicle, such as an automobile, but also a moving object (moving apparatus), such as a ship, an aircraft, or an industrial robot. The moving object includes either or both a drive power generation unit or (and) a rotary member. The drive power generation unit mainly generates drive power for use in moving the moving object, and the rotary member is mainly used to move the moving object. The drive power generation unit may be an engine or a motor. The rotary member may be a tire, a wheel, a ship propeller, or an aircraft propeller. Furthermore, applications are also feasible not only for moving objects but also for devices that widely use object recognition, such as ITS.

While various types of equipment are described above according to the exemplary embodiments, a mechanical apparatus may further be included. The mechanical apparatus of a camera is capable of driving components of an optical system for zooming, focusing, and shutter operations. Further, the mechanical apparatus of the camera is capable of moving the photoelectric conversion apparatus for image stabilization operations.

Further, the equipment may be transport equipment such as a vehicle, a ship, or a flying object. The mechanical apparatus of transport equipment may be used as a moving apparatus. The equipment as transport equipment is suitable to transport the photoelectric conversion apparatus or to assist with driving (piloting) and/or automate driving (piloting) using imaging functions. A processing apparatus for assisting with and/or automating driving (piloting) is capable of performing processes for operating the mechanical apparatus as a moving apparatus based on information acquired by the photoelectric conversion apparatus.

In the present specification, unless otherwise defined explicitly, the phrases "A or B" and "at least one of A and B" each encompass all possible combinations of the listed items. Further, unless otherwise defined explicitly, the phrases "at least one of A or/and B" and "one or more of A or/and B" each encompass all possible combinations of the listed items. Specifically, the foregoing phrases are understood to refer to all of a case where at least one A is included, a case where at least one B is included, and a case where at least one A and at least one B are both included. The same applies to combinations of three or more elements.

The exemplary embodiments described above can be modified as appropriate within the range that does not deviate from the technical concept. The disclosure of the present specification includes not only the matters described in the present specification but also all matters that can be understood from the present specification and the drawings attached to the present specification. Further, the disclosure of the present specification includes the complement of the concepts described in the present specification. Specifically, in a case where the present specification includes, for example, the description "A is greater than B", it is understood that the present specification discloses that "A is not greater than B", even if the description "A is not greater than B" is not included. This is because the inclusion of the description "A is greater than B" is based on the assumption that the case where "A is not greater than B" is taken into account.

The present disclosure makes it possible to provide a photoelectric conversion element capable of preventing a decrease in resolution while preventing event detection omissions.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-173736, filed Oct. 5, 2023, which is hereby incorporated by reference herein in its entirety.

What is claimed is:

1. An apparatus comprising:

a photodiode including a first terminal and a second terminal;

a detection circuit configured to detect whether an event has occurred based on whether an amount of change in an amount of incident light exceeds a predetermined threshold;

a counting circuit configured to count the number of incident photons within a predetermined exposure period;

a first switch configured to switch between a first mode in which the photodiode and the detection circuit are connected to each other and a second mode in which the photodiode and the counting circuit are connected to each other;

a second switch configured to switch a potential of the first terminal of the photodiode; and a mode control circuit configured to control the first switch, wherein the second switch switches between the first mode and the second mode.

2. The apparatus according to claim 1, wherein the second switch switches the potential of the first terminal to a ground potential or a negative potential.

3. The apparatus according to claim 1, further comprising a third switch between the second terminal of the photodiode and a power supply voltage, wherein the third switch switches between a charged state and a non-charged state of the photodiode.

4. The apparatus according to claim 1, further comprising:

a first substrate including the photodiode; and a second substrate including a processing circuit configured to process a signal from the photodiode, wherein the first substrate and the second substrate are stacked.

5. The apparatus according to claim 4, wherein the second switch is arranged on the first substrate outside of a pixel region in which the photodiode is arranged.

6. The apparatus according to claim 5, wherein the second switch is provided on the second substrate.

7. The apparatus according to claim 6, wherein a plurality of photodiodes and a plurality of second switches are included, and wherein the plurality of second switches is arranged to individually correspond to the plurality of photodiodes.

8. The apparatus according to claim 7, wherein the photodiode is an avalanche photodiode.

9. The moving object according to claim 5, wherein the second switch switches the potential of the first terminal to a ground potential or a negative potential.

10. The apparatus according to claim 1, wherein the photodiode is an avalanche photodiode.

11. A system comprising:

the apparatus according to claim 1; and a processing unit configured to generate an image using a signal output from the apparatus.

12. The system according to claim 11, further comprising a third switch between the second terminal of the photodiode and a power supply voltage, wherein the third switch switches between a charged state and a non-charged state of the photodiode.

13. The system according to claim 11, wherein the photodiode is an avalanche photodiode.

14. The system according to claim 11, wherein the second switch switches the potential of the first terminal to a ground potential or a negative potential.

15. A moving object comprising:

the apparatus according to claim 1; and a control unit configured to control movement of the moving object using a signal output from the apparatus.

16. The moving object according to claim 15, further comprising a third switch between the second terminal of the photodiode and a power supply voltage, wherein the third switch switches between a charged state and a non-charged state of the photodiode.

17. The moving object according to claim 15, wherein the photodiode is an avalanche photodiode.

* * * * *